US007890980B2

(12) United States Patent
Yun et al.

(10) Patent No.: US 7,890,980 B2
(45) Date of Patent: Feb. 15, 2011

(54) METHOD FOR RECEIVING BROADCASTING SIGNAL AND BROADCASTING RECEIVER

(75) Inventors: Chang Sik Yun, Daejeon (KR); In Hwan Choi, Gyeonggi-do (KR); Kook Yeon Kwak, Gyeonggi-do (KR); Hyoung Gon Lee, Seoul (KR); Won Gyu Song, Seoul (KR); Jin Pil Kim, Seoul (KR); Jong Moon Kim, Gyeonggi-do (KR); Jin Woo Kim, Seoul (KR); Byoung Gill Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/728,161

(22) Filed: Mar. 19, 2010

(65) Prior Publication Data

US 2010/0172327 A1    Jul. 8, 2010

Related U.S. Application Data

(63) Continuation of application No. 12/035,261, filed on Feb. 21, 2008, now Pat. No. 7,793,320.

(60) Provisional application No. 60/911,510, filed on Apr. 12, 2007, provisional application No. 60/947,984, filed on Jul. 4, 2007.

(30) Foreign Application Priority Data

Feb. 23, 2007    (KR)    ...................... 10-2007-0018592

(51) Int. Cl.
*H04N 7/20*    (2006.01)

(52) U.S. Cl. .............................. 725/68; 725/67; 725/71; 725/81; 725/90; 725/101; 725/112; 725/113; 455/10; 455/15; 455/18; 455/12.1; 375/222; 375/240.1; 375/262; 375/264; 375/265; 375/270; 375/277; 375/285; 375/296; 375/301; 375/316; 375/321; 375/326; 375/340; 375/341; 375/346; 375/349; 348/14.13; 348/385.1; 348/393.1; 348/395.1; 348/391.1; 348/400.1; 348/403.1; 348/425.3; 348/432.1; 348/460; 348/473; 348/474; 348/726; 370/912; 370/916

(58) Field of Classification Search ............. 725/67–68, 725/71, 81, 90, 101, 112–113; 455/10, 15, 455/18, 12.1; 375/222, 240.1, 262, 264–265, 375/270, 277, 285, 296, 301, 316, 321, 326, 375/340, 341, 346, 349; 348/14.13, 385.1, 348/393.1, 395.1, 391.1, 400.1, 403.1, 425.3, 348/432.1, 460, 473, 474, 726; 370/912, 370/916

See application file for complete search history.

(56) References Cited

U.S. PATENT DOCUMENTS

| | | | |
|---|---|---|---|
| 5,634,138 | A | 5/1997 | Ananthan et al. |
| 5,649,284 | A | 7/1997 | Yoshinobu |
| 5,797,093 | A | 8/1998 | Houde |
| 6,038,440 | A | 3/2000 | Wu |
| 6,067,457 | A | 5/2000 | Erickson et al. |
| 6,243,469 | B1 | 6/2001 | Kataoka et al. |
| 6,308,066 | B1 | 10/2001 | Ranta et al. |
| 6,370,391 | B1 | 4/2002 | Lietsalmi et al. |
| 6,977,914 | B2 | 12/2005 | Paila et al. |
| 7,054,612 | B2 | 5/2006 | Patel |
| 7,206,352 | B2 * | 4/2007 | Birru et al. ................... 375/265 |
| 7,584,495 | B2 * | 9/2009 | Hannuksela et al. ......... 725/101 |

(Continued)

FOREIGN PATENT DOCUMENTS

KR    10-2000-0040481    7/2000

(Continued)

*Primary Examiner*—Jason P Salce
(74) *Attorney, Agent, or Firm*—Lee, Hong, Degerman, Kang & Waimey

(57) ABSTRACT

A method for receiving a broadcasting signal and a broadcasting signal receiver are disclosed. Even when a cell is changed while an emergency alert is output, the emergency alert can be continuously output using emergency alert table information included in the broadcasting signal and channel information of the cell. The emergency alert table information may include a cell identifier and the channel information of the cell may include virtual channel information of the cell.

10 Claims, 19 Drawing Sheets

U.S. PATENT DOCUMENTS

| | | |
|---|---|---|
| 2003/0125025 A1 | 7/2003 | Lim |
| 2005/0054345 A1 | 3/2005 | Lee |
| 2005/0168641 A1 | 8/2005 | Seo |
| 2006/0029159 A1 | 2/2006 | Oh et al. |
| 2006/0040639 A1 | 2/2006 | Karl et al. |
| 2006/0184965 A1 | 8/2006 | Lee et al. |
| 2007/0172003 A1* | 7/2007 | Kim et al. .................. 375/326 |
| 2007/0195889 A1* | 8/2007 | Hong et al. ............ 375/240.25 |
| 2007/0204291 A1 | 8/2007 | Ichihashi |
| 2007/0297544 A1* | 12/2007 | Choi et al. .................. 375/346 |
| 2008/0002765 A1* | 1/2008 | Song et al. ............. 375/240.01 |
| 2008/0170162 A1* | 7/2008 | Kim et al. ................... 348/725 |
| 2009/0265751 A1* | 10/2009 | Limberg ..................... 725/118 |

FOREIGN PATENT DOCUMENTS

| | | |
|---|---|---|
| KR | 10-2006-0055959 | 5/2006 |
| KR | 10-2006-0068449 | 6/2006 |
| KR | 10-2007-0013168 | 1/2007 |
| WO | 01-05157 | 1/2001 |

* cited by examiner

FIG. 7

| Value or Range | Meaning | Where Defined |
|---|---|---|
| 0x0000 | Terrestrial Virtual Channel Table (current) | A/65 PSIP |
| 0x0001 | Terrestrial Virtual Channel Table (next) | A/65 PSIP |
| 0x0002 | Cable Virtual Channel Table (current) | A/65 PSIP |
| .... | .... | .... |
| 0x0021 | Network Information Table (MMS Sbutype) | SCTE 65 |
| 0x0022 | Cell Information Table | A/65 PSIP |
| 0x0023~0x002F | Reserved for future ATSC/SCTE use | |
| .... | .... | .... |
| 0x1280~0xFFFF | Reserved for future ATSC/SCTE use | |

FIG. 8

| Field Name | No. of bits | Description and Field Value |
|---|---|---|
| cell_information_table_section { | | Start of the master_guide_table_section(). |
|   table_id | 8 | 0xCE |
|   section_syntax_indicator | 1 | bslbf 1b, The CIT uses the MPEG "long-form" syntax. |
|   private_indicator | 1 | bslbf 1b, Set to 1 in PSIP tables |
|   reserved | 2 | bslbf 11b, Reserved bits are set to 1. |
|   section_length | 12 | uimsbf section_length is limited to 1021. |
|   transport_stream_id | 16 | uimsbf |
|   reserved | 2 | bslbf 11b, Reserved bits are set to 1. |
|   version_number | 5 | uimsbf The version of a table section. |
|   current_next_indicator | 1 | bslbf 1b |
|   section_number | 8 | uimsbf |
|   last_section_number | 8 | uimsbf |
|   protocol_version | 8 | uimsbf 0, currently defined in s for protocol_version zero. |
|   num_cells_in_section | 8 | uimsbf Specifies the num of cells |
|   for(i=0;i<num_cells_in_section;i++) { | | |
|     cell_id | 8 | uimsbf This 8-bit field acts as the database linkage between the MGT and CIT |
|     cell_text | 7*16 | uimsbf Seven Unicode UTF-16 encoded characters, representing the "cell name" of the cell |
|     cell_location | 7*16 | uimsbf Seven Unicode UTF-16 encoded characters, representing the "cell location" of the cell |
|     num_channels_in_cell | 8 | uimsbf Specifies the channel num of each cell |
|     for(j=0;j<num_channels_in_cell;j++) { | | uimsbf Specifies the channel num of each cell |
|       major_channel_number | 10 | uimsbf |
|       minor_channel_number | 10 | uimsbf |
|       modulation_mode | 8 | uimsbf enumerated type field that indicates the modulation mode |
|       carrier_frequency | 32 | uimsbf Specifies carrier frequency |
|       channel_TSID | 16 | uimsbf |
|       program_number | 16 | uimsbf |
|       reserved | 6 | uimsbf |
|       descriptors_length | 10 | uimsbf |
|       for(k=0;k<N;k++) { | | |
|         descriptor() | | |
|       } | | |
|     } | | |
|     descriptors_length | 10 | uimsbf |
|     for(k=0;k<N;k++) { | | |
|       descriptor() | | |
|     } | | |
|   } | | |
|   descriptors_length | 10 | uimsbf |
|   for(i=0;i<N;i++) { | | |
|     descriptor() | | |
|   } | | |
|   CRC_32 | 32 | A 32-bit checksum error detection code. |
| } | | |

FIG. 9

| Field Name | Number of Bits | Description and Field Value |
|---|---|---|
| master_guide_table_section {<br>  table_id | 8 | Start of the master_guide_table_section().<br>0xC7 |
| ..... | ... | .... |
|   table_id_extension | 16 | 0x0000, Set to zero for the MGT |
|   cell_id | 2 | index of cell in CIT |
|   version_number | 5 | |
|   current_next_indicator | 1 | 1b |
|   section_number | 8 | 0, The MGT must fit into a single table section. |
| .... | ... | |
|   tables_defined<br>  for (i=0;i<tables_defined;i++) { | 16 | gives the number of table types defined in the MGT |
|     table_type | 16 | defines the type of table |
|     reserved | 3 | Reserved bits are set to 1. |
|     table_type_PID | 13 | Specifies the PID that is used to receive table_type |
|     reserved | 3 | Reserved bits are set to 1. |
|     .... | ... | .... |
|   }<br>  descriptor_length<br>  for (i=0; i<N;i++) { | 12 | |
|     descriptor() | var | Zero or more descriptors, formatted |
|   }<br>  CRC_32<br>} | 32 | A 32-bit checksum value. |

FIG. 10

| Field Name | Number of Bits | Description and Field Value |
|---|---|---|
| Cell_Link_Descriptor {  |   | Start of the cell_link_descriptor |
| descriptor_tag | 8 | 0xAB |
| descriptor_length | 8 | indicates the length, in bytes |
| cell_id | 2 | index of cell in CIT |
| reserved | 6 | Reserved bits are set to 1. |
| } |   |   |

FIG. 11

| Syntax | Bits | Description |
|---|---|---|
| table_ID | 8 | value 0xD8 |
| section_syntax_indicator | 1 | '1' |
| zero | 1 | '0' |
| reserved | 2 | '11' |
| section_length | 12 | uimsbf |
| table_id_extension | 16 | '0x0000' |
| reserved | 2 | '11' |
| sequence_number | 5 | uimsbf |
| current_next_indicator | 1 | bslibf |
| section_number | 8 | uimsbf |
| last_section_number | 8 | uimsbf |
| protocol_version | 8 | uimsbf |
| EAS_originator_code | 24 | Three ASCII characters |
| EAS_event_code_length | 8 | uimsbf (N) |
| EAS_event_code | 8*N | N ASCII characters |
| nature_of_activation_text_length | 8 | uimsbf |
| nature_of_activation_text() | var | uimsbf |
| alert_message_time_remaining | 8 | uimsbf range 0~120 |
| event_start_time | 32 | uimsbf |
| event_duration | 16 | uimsbf range 15~6000 |
| reserved | 12 | bslibf |
| alert_priority | 4 | uimsbf |
| details_channel_source | 4 | bslibf |
| reserved | 4 | '1111' |

| Syntax | Bits | Description |
|---|---|---|
| alert_text_length | 16 | uimsbf |
| alert_text_rate | 16 | uimsbf |
| alert_text() | var | var |
| location_code_count | 8 | uimsbf |
| for (I=0;I<location_code_count;I++){ | | |
| country_code | 8 | uimsbf 0~255 |
| state_code | 8 | uimsbf 0~99 |
| state_subdivision_code | 8 | uimsbf 0~99 |
| county_code | 8 | uimsbf 0~99 |
| } | | |
| exception_count | 8 | uimsbf |
| for(I=0'I<exception_count;I++){ | | |
| exception_major_channel_number | 16 | uimsbf |
| exception_minor_channel_number | 16 | uimsbf |
| } | | |
| reserved | 6 | '111111' |
| description_length | 10 | uimsbf |
| for(I=0; I<N; I++){ | | |
| descriptor() | var | Optional |
| } | | |
| CRC_32 | 32 | |

FIG. 12

| Field Name | Bits | Description |
|---|---|---|
| EAT_channel_descriptor() { | | |
| descriptor_tag | 8 | value 0xEA |
| descriptor_length | 8 | uimsbf |
| cell_ID | 8 | uimsbf |
| details_major_channel_number | 16 | uimsbf |
| details_minor_channel_number | 16 | uimsbf |
| carrier_frequency | 32 | uimsbf |
| details_channel_programNumber | 8 | uimsbf |
| details_channel_tsID | 16 | uimsbf |
| } | | |

FIG. 13

| Syntax | Bits | Description |
|---|---|---|
| table_ID | 8 | value 0xD8 |
| section_syntax_indicator | 1 | '1' |
| zero | 1 | '0' |
| reserved | 2 | '11' |
| section_length | 12 | uimsbf |
| table_id_extension | 16 | '0x0000' |
| reserved | 2 | '11' |
| sequence_number | 5 | uimsbf |
| current_next_indicator | 1 | bslibf |
| section_number | 8 | uimsbf |
| last_section_number | 8 | uimsbf |
| protocol version | 8 | uimsbf |
| EAS_originator_code | 24 | Three ASCII characters |
| EAS_event_code_length | 8 | uimsbf (N) |
| EAS_event_code | 8*N | N ASCII characters |
| nature_of_activation_text_length | 8 | uimsbf |
| nature_of_activation_text() | var | uimsbf |
| alert_message_time_remaining | 8 | uimsbf range 0~120 |
| event_start_time | 32 | uimsbf |
| event_duration | 16 | uimsbf range 15~6000 |
| reserved | 12 | bslibf |
| alert_priority | 4 | uimsbf |
| details_channel_source | 4 | bslibf |
| cell_id | 4 | bslibf |
| details_major_channel_number | 16 | uimsbf |
| details_minor_channel_number | 16 | uimsbf |
| details_carrier_frequency | 32 | uimsbf |
| details_program_number | 8 | uimsbf |

| Syntax | Bits | Description |
|---|---|---|
| details_channel_TSID | 16 | uimsbf |
| alert_text_length | 16 | uimsbf |
| alert_text_rate | 16 | uimsbf |
| alert_text() | var | var |
| location_code_count | 8 | uimsbf |
| for (l=0;l<location_code_count;l++){ | | |
| country_code | 8 | uimsbf 0~255 |
| state_code | 8 | uimsbf 0~99 |
| county_subdivision | 4 | uimsbf 0~9 |
| reserved | 2 | '11' |
| county_code | 10 | uimsbf 0~999 |
| } | | |
| exception_count | 8 | uimsbf |
| for(l=0'l<exception_count;l++){ | | |
| exception_major_channel_number | 16 | uimsbf |
| exception_minor_channel_number | 16 | uimsbf |
| reserved | 6 | '111111' |
| description_length | 10 | uimsbf |
| for(l=0; l<N; l++)} | | |
| descriptor() | var | Optional |
| } | | |
| CRC_32 | 32 | |

METHOD FOR RECEIVING BROADCASTING SIGNAL AND BROADCASTING RECEIVER

CROSS-REFERENCES TO RELATED APPLICATIONS

The present application is a continuation application of U.S. patent application Ser. No. 12/035,261, filed on Feb. 21, 2008, titled "Method for Receiving Broadcasting Signal and Broadcasting Receiver," now U.S. Pat. No. 7,793,320, which claims the priority benefit of Korean Application No. 10-2007-0018592, filed on Feb. 23, 2007, U.S. Provisional Application No. 60/911,510, filed on Apr. 12, 2007, and U.S. Provisional Application No. 60/947,984, filed on Jul. 4, 2007, which are hereby incorporated by reference.

BACKGROUND

1. Field of the Disclosure

The present disclosure relates to a method for receiving a broadcasting signal and a broadcasting receiver.

2. Discussion of the Related Art

As digital broadcasting technologies have been developed, a user can receive various additional services as well as a broadcasting signal such as a video/audio signal. A digital broadcasting signal is transmitted through satellite, cable, terrestrial and Internet networks and is provided to the user. A digital broadcasting receiver can receive the digital broadcasting signal and provide various additional services as well as the video/audio signal to the user.

Recently, a natural disaster such as an earthquake or a flood or an emergency such as a terrorist threat or an incendiary fire increasingly occurs. The damage degree of the terrorist threat or the natural disaster due to environmental pollution is increased and the ripple effect thereof is also increased.

When such an emergency occurs, an emergency alert message may be included in a broadcasting signal and may be provided to the user. The user can obtain information on the emergency through the emergency alert message while viewing a broadcasting program. A broadcasting receiver for receiving a broadcasting signal including additional services such as the emergency alert message or a video signal may include a fixed broadcasting receiver for receiving the broadcasting signal without movement thereof and a mobile broadcasting receiver for receiving the broadcasting signal while moving.

Unlike the fixed broadcasting receiver, the mobile broadcasting receiver should continuously output the service such as the emergency alert message included in the received broadcasting signal.

SUMMARY OF THE INVENTION

Accordingly, the present invention is directed to a method for receiving a broadcasting signal and a broadcasting receiver that substantially obviate one or more problems due to limitations and disadvantages of the related art.

An object of the present invention is to provide a method for receiving a broadcasting signal and a broadcasting receiver for receiving the broadcasting signal, which are capable of continuously providing a service such as an emergency alert message while moving.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for receiving a broadcasting signal includes receiving emergency alert table information describing an emergency alert message and channel information of a cell from the broadcasting signal received from a first channel of a first cell which is a transmission area of the broadcasting signal. The emergency alert message is output using the received emergency alert table information. When handing over from the first cell to a second cell, an identifier of the second cell is obtained and the emergency alert message, which has been output from the first cell, is continuously output from the second cell using the channel information of the cell.

In another aspect of the present invention, a broadcasting signal receiver includes a tuner configured to tune into a broadcasting signal transmitted by a first cell, a demodulator configured to demodulate the tuned broadcasting signal, a demultiplexer configured to demultiplex the demodulated broadcasting signal, a program table information decoder configured to parse an emergency alert table in the demultiplexed broadcasting signal, a decoder configured to decode an audio/video signal in the broadcasting signal parsed by the demultiplexer, an output unit configured to output the broadcasting signal decoded by the decoder and a controller configured to control an emergency alert to be output using information obtained from the emergency alert table in the broadcasting signal of the first cell and controls the emergency alert to be continuously output even when handing over from the first cell to a second cell.

The emergency alert table information may include the identifier of the cell. The emergency alert table information may include at least one of virtual channel information for transmitting the emergency alert message, carrier frequency information, information on a program number of a channel for transmitting the emergency alert, and transport stream identifier.

The channel information of the cell may be obtained from table information including virtual channel information of the identifier of the cell.

The identifier of the second cell may be obtained from any one of a master guide table (MGT) of the received broadcasting signal, the emergency alert table information and signaling information of the received broadcasting signal. The emergency alert table information may include a field for reporting priority of the alert.

The controller may control the tuner to tune the channel to a channel for transmitting the same broadcasting contents as broadcasting contents output from the first channel of the first cell, among channels of the second cell, using the channel information of the cell, if the output of the emergency alert message is finished.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a view showing a cell information table (CIT) including channel information of each cell;

FIG. 8 is a view showing the syntax of an emergency alert table;

FIG. 9 is a view showing the syntax of including channel information for emergency alert broadcasting;

FIG. 10 is a view showing the syntax of a descriptor including channel information for emergency alert broadcasting;

FIG. 11 is a view showing the syntax of the emergency alert table;

FIG. 12 is a view showing an example of the syntax of the descriptor including the emergency alert broadcasting channel information;

FIG. 13 is a view showing the syntax of an emergency alert table including the emergency alert broadcasting channel information;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A broadcasting system for receiving a broadcasting signal while moving includes a digital video broadcasting (DVB) system, a digital multimedia broadcasting (DMB) system, and a digital multimedia broadcasting-terrestrial handheld (DMB-TH) system. Hereinafter, for example, a method for transmitting/receiving a broadcasting signal according to a modulation scheme called a mobile vestigial sideband (MVSB) scheme will be described.

In an advanced television system committee (ATSC) broadcasting system, a broadcasting signal receiver includes a service multiplexer and a transmitter.

Here, the service multiplexer may be located at a studio of each broadcasting station and the transmitter may be located at one or more specific sites. A plurality of transmitters may share the same frequency. In this case, the plurality of transmitters transmits the same signal. The service multiplexer multiplexes main service data for fixed reception and mobile service data for mobile reception. The transmitter modulates the multiplexed broadcasting data and transmits the modulated broadcasting data. Hereinafter, for convenience of description, a method for modulating the main service data for fixed reception and the mobile service data for mobile reception is called a mobile VSB (MVSB). If the broadcasting data for mobile reception is transmitted, the transmitter modulates the mobile service data for mobile reception such that the data can be stably received, regardless of various distortions or noise which may occur in a transmission channel.

A broadcasting signal receiver can compensate for the signal distortions and restore the broadcasting signal. Data communication between the service multiplexer and the transmitter, both of which are separated from each other, may be performed by various methods. For example, the standard such as synchronous serial interface for transport of MPEG-2 data (SMPTE-310M) may be used.

An MVSB transmission system can multiplex main service data and mobile service data in the same channel and transmit/receive the multiplexed data while being compatible with the existing ATSC VSB transmission system. The MVSB system uses a multi-frequency network for broadcasting the same program using different frequencies according to the transmitters.

Figure 1:
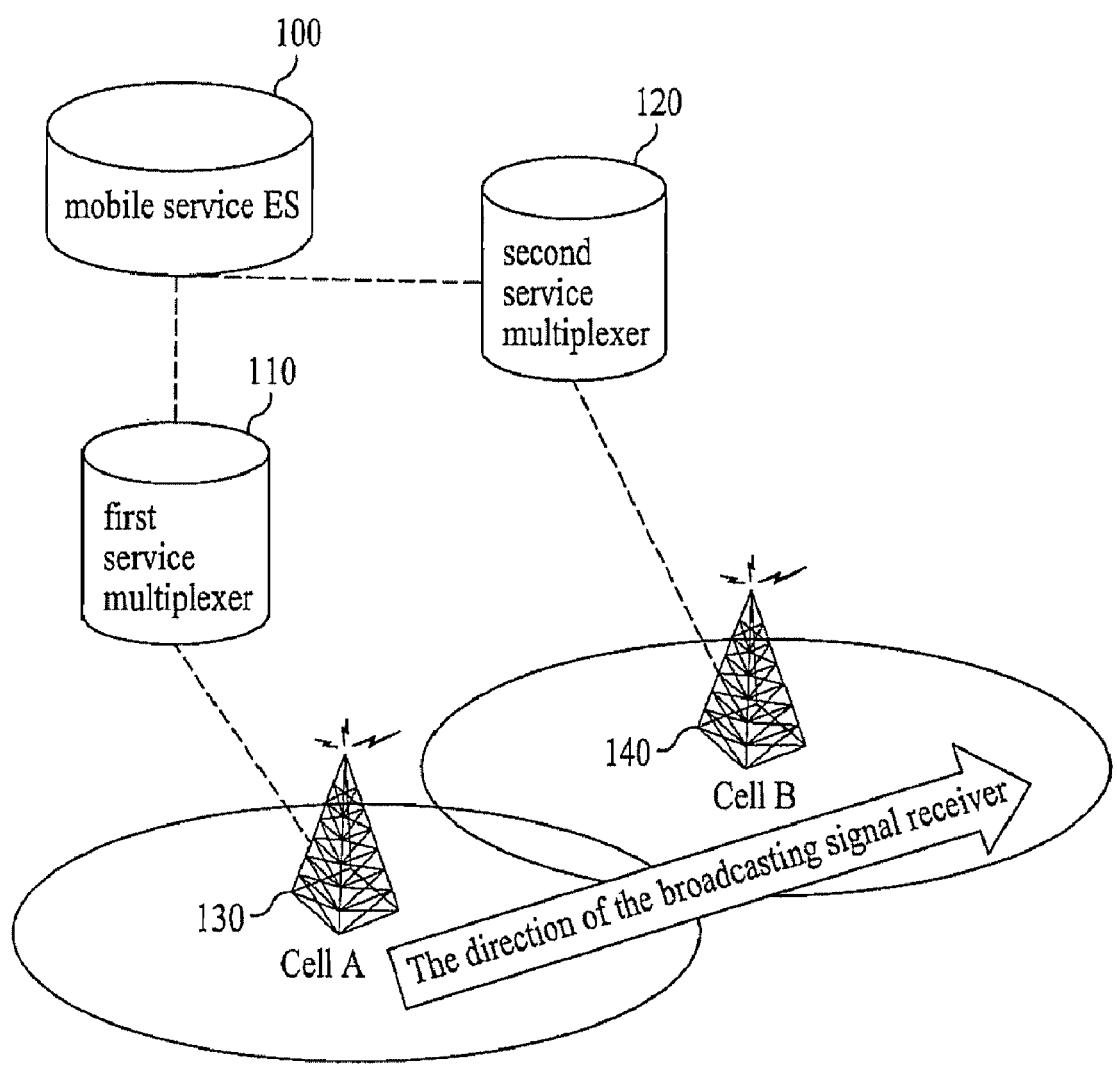
FIG. 1 is a view showing an example of a multi-channel network.

FIG. 1 is view showing an example of a multi-channel network. A mobile service elementary stream (ES) is transmitted from a broadcasting station 100 to an MVSB service multiplexer. In FIG. 1, mobile service ES is transmitted from the broadcasting station 100 to a first service multiplexer 110 and a second service multiplexer 120.

A broadcasting signal multiplexed by the first service multiplexer 110 is transmitted through a first transmitter 130 and a broadcasting signal multiplexed by the second service multiplexer 120 is transmitted through a second transmitter 140.

The transmitters can transmit the mobile service ES transmitted from the service multiplexer 120 with different frequencies suitable for network environments of the respective channels thereof. A range which is influenced by one network transmission system in a multi-channel network is called as a cell.

In FIG. 1, a range which is influenced by a transmission system of the first transmitter 130 is a cell A and a range which is influenced by a transmission system of the second transmitter 140 is a cell B. Since a user should continuously view a broadcasting program even when the MVSB broadcasting receiver moves between several cells, the broadcasting station includes a cell ID corresponding to each transmitter in an MVSB broadcasting signal and transmits the MVSB broadcasting signal. Accordingly, each transmitter may have a unique cell ID.

The broadcasting receiver can identify a cell, in which the broadcasting receiver is currently located, using the cell ID included in the MVSB broadcasting signal and continuously output the broadcasting contents even when the broadcasting receiver moves between the cells. In addition, the broadcasting station can include channel information of each cell and the cell ID in the broadcasting signal and transmit the broadcasting signal. Since the transmitters can transmit the broadcasting signal transmitted from the same broadcasting station through different physical channels, the channel information of each cell may be changed.

If the receiver moves from the cell A to the cell B, the transmitter of the cell can be identified using the cell ID included in the broadcasting signal. Then, the channel information of the identified transmitter is analyzed. The receiver obtains the channel information of the cell B corresponding to the channel of the cell A which has been viewed and changes the channel information of the cell A to the channel information of the cell B. The broadcasting signal is received according to the channel information of the cell B and is provided to the user.

Figure 2:
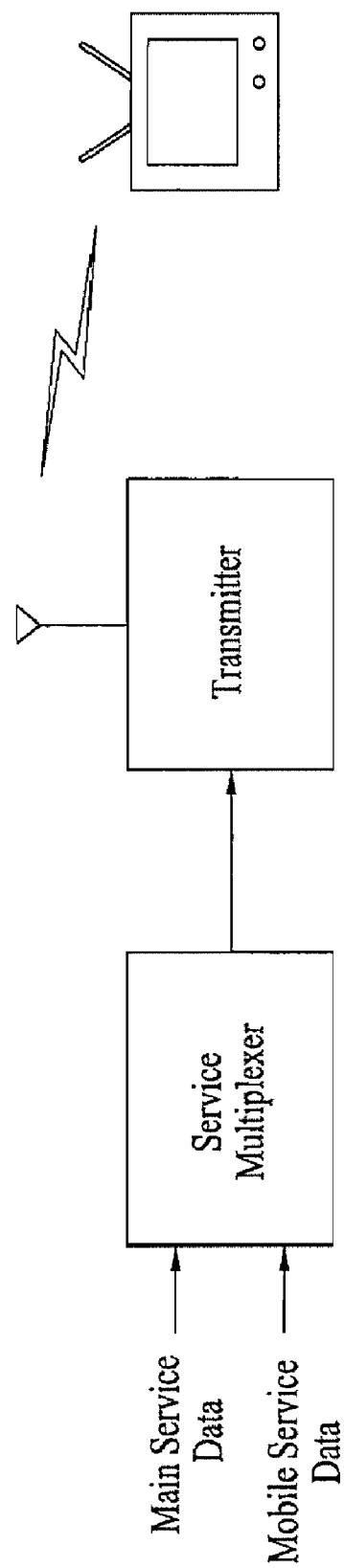
FIG. 2 is a schematic view showing a broadcasting system according to a mobile vestigial sideband (MVSB)

FIG. 2 is a schematic block diagram showing the ATSC broadcasting system in order to easily describe the present invention.

In the ATSC broadcasting system, a device for transmitting a broadcasting signal includes a service multiplexer and a transmitter.

Here, the service multiplexer may be located at a studio of each broadcasting station and the transmitter may be located at one or more specific sites. A plurality of transmitters may share the same frequency. In this case, the plurality of transmitters transmits the same signal. The service multiplexer multiplexes main service data for fixed reception and mobile service data for mobile reception. The transmitter modulates the multiplexed broadcasting data and transmits the modulated broadcasting data. Hereinafter, for convenience of description, a method for modulating the main service data for fixed reception and the mobile service data for mobile reception is called a mobile VSB (MVSB). If the broadcasting data for mobile reception is transmitted, the transmitter modulates the mobile service data for mobile reception such that the data can be stably received, regardless of various distortions or noise which may occur in a transmission channel.

A broadcasting signal receiver can compensate for the signal distortions and restore the broadcasting signal. Data communication between the service multiplexer and the transmitter, both of which are separated from each other, may be performed by various methods. For example, the standard such as synchronous serial interface for transport of MPEG-2 data (SMPTE-310M) may be used.

Figure 3:
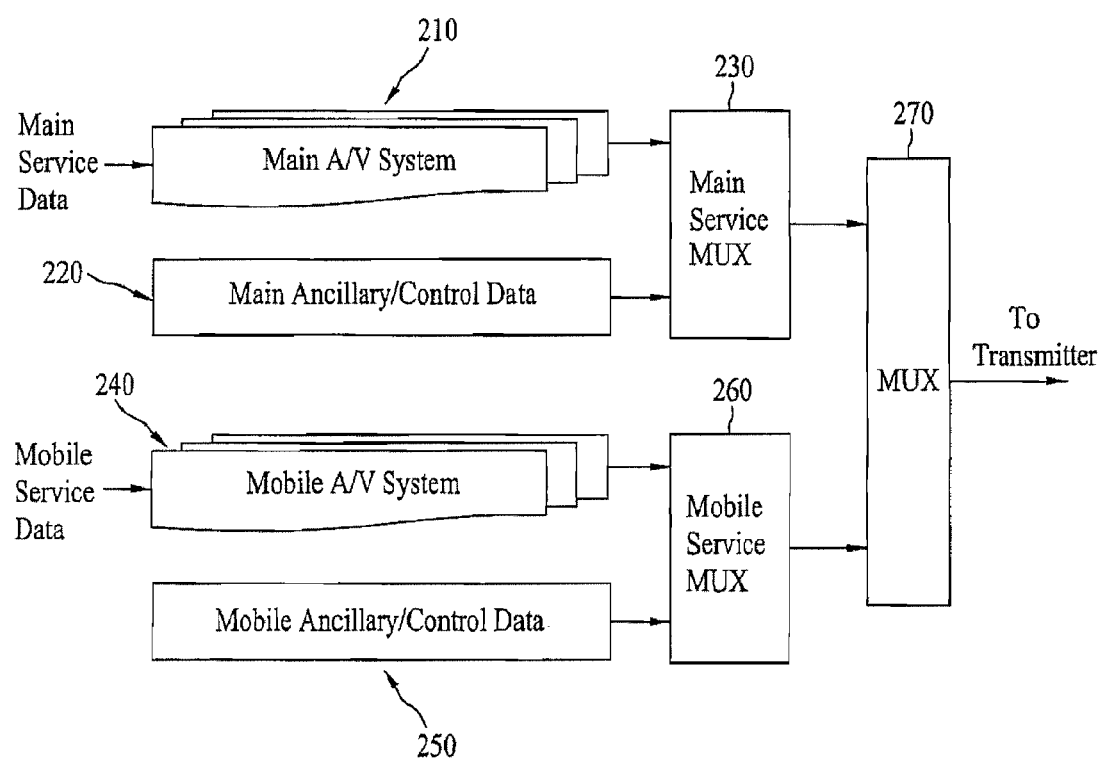
FIG. 3 is a view showing an example of a service multiplexer shown in FIG. 2.

FIG. 3 is a view showing an example of the service multiplexer in the broadcasting signal receiver in FIG. 2. The service multiplexer shown in FIG. 2 includes a main audio/video (A/V) system 210, main ancillary/control data system 220, a mobile A/V system 240, a mobile ancillary/control data system 250, a main service multiplexer 230, a mobile service multiplexer 260 and a transmission service multiplexer 270.

Main service data is encoded and compressed by the main A/V system 210 and is output to the main service multiplexer 230. If the number of types of main service data is greater than one, a plurality of main A/V systems may be included. The main service multiplexer 230 multiplexes the output of the main A/V system 210 and various types of additional data 220 of the main service and outputs the multiplexed data to the transmission service multiplexer 270.

Similarly, mobile service data is encoded and compressed by the mobile A/V system 240 and is output to the mobile service multiplexer 260. If the number of types of mobile service data is greater than one, a plurality of mobile A/V systems may be included. The mobile service multiplexer 260 multiplexes the output of the mobile A/V system 240 and various types of additional data of the mobile service and outputs the multiplexed data to the transmission service multiplexer 270.

The transmission service multiplexer 270 multiplexes the output of the main service multiplexer 230 and the output of the mobile service multiplexer 260 and outputs the multiplexed data to the transmitter. The output data of the transmission service multiplexer 270 may be expressed in the form of an MPEG-2 transport stream (TS) packet.

The transmission service multiplexer 270 can transmit the service data to the transmitter at a constant data rate. The transmission service multiplexer 270 can transmit the service data to the transmitter at a constant data rate even when the service data transmitted to the transmitter includes only the main service data or both the main service data and the mobile service data. For example, if the transmission service multiplexer 270 transmits the data to the transmitter at 19.39 Mbps, the mobile service data is multiplexed with the main service data and is transmitted within 19.39 Mbps. The mobile service data may be subjected to be error correction coding process in the transmitter and thus the data rate of the mobile service data may be reduced in consideration of the error correction encoding process.

If the output of the service multiplexer needs to be maintained at the constant data rate, for example, 19.39 Mbps, at least one of the main service multiplexer, the mobile service multiplexer and the transmission data multiplexer may insert null data or null packet in the multiplexed data so as to match the data rate of the final output to the constant data rate. Here, the null data may be generated in the multiplexer or may be received from an external device.

Figure 4:
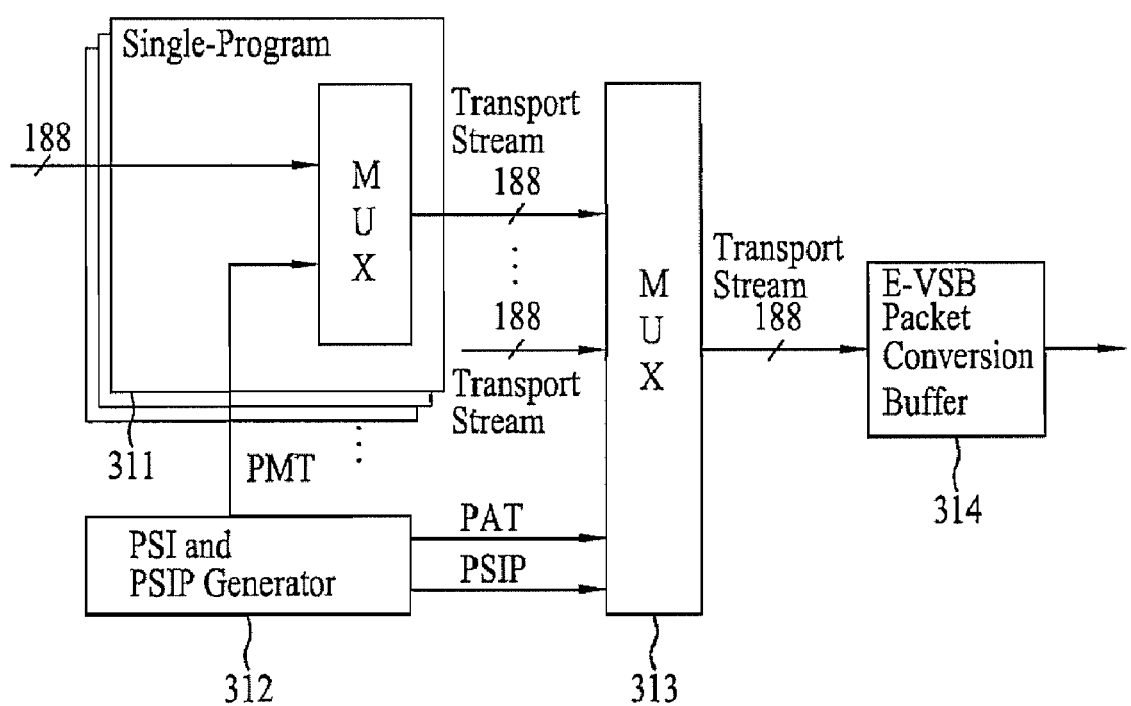
FIG. 4 is a view showing an example of a mobile service multiplexer.

FIG. 4 is a view showing an example of a mobile service multiplexer of the service multiplexer shown in FIG. 3. The mobile service multiplexer shown in FIG. 4 includes a first multiplexer 311, a program table information generator 312, a second multiplexer 313 and a packet conversion buffer 314.

The first multiplexer 311 multiplexes mobile data of an MPEG-2 TS format and program table information, such as a program map table (PMT), generated by the program table information generator 312 and outputs the multiplexed data to the second multiplexer 313. The program table information generator 312 generates information according to program specific information (PSI) or program and system information protocol (PSIP). The PSI includes information such as the PMT, a program association table (PAT) and a network information table (NIT) and the PSIP includes a system time table (STT), a rating region table (RRT), a master guide table (MGT), a virtual channel table (VCT), an event information table (EIT) and an extended text table (ETT). Hereinafter, the information on the broadcasting signal which is transmitted in the form of at least one section, such as the PSI/PSIP, is called the program table information. The program table information generator 312 can transmit physical channel information of the cells in addition to a cell, which currently receives the signal, by the program table information. Hereinafter, for convenience of description, it is assumed that the physical channel information of the cells is included in the program table information called the NIT.

The second multiplexer 313 multiplexes the output of the first multiplexer 311 and the output of the program table information generator 312 and outputs the multiplexed signal to the packet conversion buffer 314. The first multiplexer 311 includes a plurality of multiplexers for multiplexing plural pieces of mobile service data and the PMT of the data. Here, one mobile service data may become a single program. Information on a physical layer for real-time broadcasting, that is, information such as time slicing of a transmission signal and a burst length, may be included in the program table information. The packet conversion buffer 314 adjusts 188-byte transport stream output from the second multiplexer 313 to a block length required in a preprocessor which will be described later.

Figure 5:
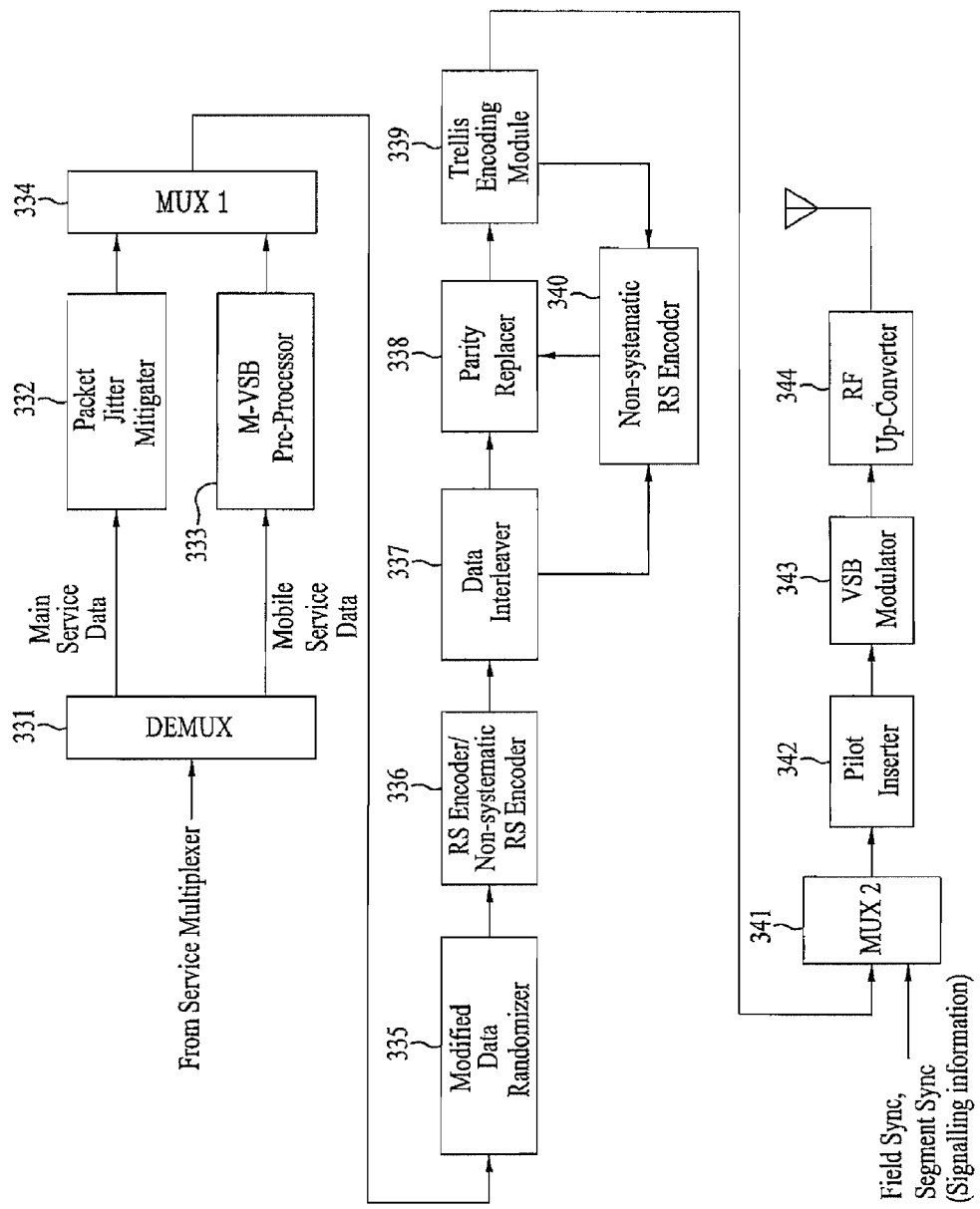
FIG. 5 is a view showing an example of a transmitter shown in FIG. 2.

FIG. 5 is a block diagram showing an example of the transmitter shown in FIG. 2.

The transmitter includes a demultiplexer 331, a packet jitter mitigater 332, an M-VSB preprocessor 333, a first transmission data multiplexer 334, a data randomizer 335, an RS encoder/non-systematic RS encoder 336, a data interleaver 337, a parity replacer 338, a non-systematic RS encoder 339, a trellis encoding module 340, a second transmission data multiplexer 341, a pilot inserter 342, a VSB modulator 343, and an RF up-converter 344.

The demultiplexer 331 of the transmitter demultiplexes the data received from the transmission service multiplexer 270, divides the data into the main service data and the mobile service data, outputs the divided main service data to the packet jitter mitigater 332, and outputs the mobile service data to the M-VSB preprocessor 333.

If the transmission service multiplexer 270 inserts the null data into the data and then transmits the data in order to match the data rate to the constant data rate, the demultiplexer 331 discards the null data by referring to the identifier which is transmitted together, processes only the remaining data, and outputs the processed data to a corresponding block. The demultiplexer 331 may set other information, such as control information necessary for transmission in the null data, and transmit the null data.

The M-VSB preprocessor 333 performs an additional encoding process with respect to the mobile service data in order to rapidly cope with noise and a channel variation. The mobile service data divided by the demultiplexer 331 is output to the M-VSB preprocessor 333. The M-VSB preprocessor 333 may randomize the mobile service data and perform an error correction coding process. If the M-VSB preprocessor 33 performs the randomizing process, the data randomizer 335 of the next stage may omit the randomizing process of the mobile service data. The randomizer of the mobile service data may be equal to or different from a randomizer defined in the ATSC.

The main service data packet and the mobile service data packet based on 188-byte units in data of a predetermined format output from the M-VSB preprocessor 333 are multiplexed according to a predefined multiplexing method and are output to the data randomizer 335. The multiplexing method can be adjusted by various variables of the system design.

In the method for multiplexing the data by the first transmission data multiplexer 334, as shown in FIG. 7, a burst period is provided on the time axis, a plurality of data groups may be transmitted in the burst period and only the main service data may be transmitted in a non-burst period. In contrast, the main service data may be transmitted in the burst period. That is, as shown in FIG. 7, a plurality of successive mobile service packets forms one data group and the plurality of data groups is mixed with the main service data packets so as to form one burst. The mobile service data or the main service data may be transmitted in one burst period.

The main service data may exist in the burst period or the non-burst period. The numbers of main data packets in the main service data period of the burst period and the main service data period of the non-burst period may be different from or equal to each other.

If the mobile service data is transmitted in the burst structure, the broadcasting signal receiver for receiving only the mobile service data is turned on only in the burst period so as to receive the data and is turned off in the period in which only the main service data is transmitted, thereby reducing the power consumption of the receiver.

The packet jitter mitigater 332 readjusts a relative location of the main service data packet such that overflow or underflow does not occur in the buffer of the decoder in the broadcasting signal receiver. Since the mobile service data group is multiplexed with the main service data in the packet multiplexing process, the temporal location of the main service packet is relatively changed. The decoder (for example, the MPEG decoder) of the device for processing the main service data of the broadcasting signal receiver may receive and decode only the main service data, recognize the mobile service data packet as the null packet, and discard the mobile service data packet. Accordingly, when the decoder of the broadcasting signal receiver receives the main service data packet multiplexed with the mobile service data group, packet jitter may occur.

Since the decoder of the receiver includes multi-stage buffers for video data and has a large size, the first transmission data multiplexer 334 may generate the packet jitter. Due to the packet jitter, overflow or underflow may occur in the buffer for the main service data of the broadcasting signal receiver, for example, the buffer for audio data.

The packet jitter mitigater 332 knows the multiplexing information of the first transmission data multiplexer 334. If it is assumed that the audio data packets are normally processed, the packet jitter mitigater 332 may rearrange the audio data packets of the main service as follows.

First, if one audio data packet is included in the main service data period of the burst period, for example, in the main service data period interposed between two mobile service data groups, the audio data packet is arranged at a foremost location of the main service data period, if two audio data packets are included in the main service data period of the burst period, the audio data packets are arranged at foremost and hindmost locations of the main service data period, and if at least three audio data packets are included in the main service data period of the burst period, two audio data packets are arranged at the foremost and hindmost locations of the main service data period and the remaining audio data packet is arranged therebetween at a uniform interval. Second, the audio data packet is arranged at a hindmost location in the main service data period before the start of the burst period. Third, the audio data packet is arranged at a foremost location in the main service data period after the completion of the burst period. The packets other than the audio data are arranged in a period excluding the locations of the audio data packets in input order.

If the locations of the main service data packets are relatively readjusted, a program clock reference (PCR) value is corrected. The PCR value is a time reference value for setting the time of the MPEG decoder, which is inserted into a specific area of a TS packet and is transmitted. The packet jitter mitigater 332 may correct the PCR value.

The output of the packet jitter mitigater 332 is input to the first transmission data multiplexer 334. The first multiplexer 334 multiplexes the main service data output from the packet jitter mitigater 332 and the mobile service data output from the M-VSB preprocessor 333 to the burst structure according to the predefined multiplexing rule and outputs the burst structure to the data randomizer 335.

The data randomizer 335 performs the same randomizing process as the existing randomizer if the received data is the main service data packet. That is, a sync byte in the main service data packet is discarded and the remaining 187 bytes are randomized using a pseudo random byte generated therein and are output to the RS encoder/non-systematic RS encoder 336.

However, if the received data is the mobile service data packet, the data randomizer 335 may discard the sync byte of 4-byte MPEG header included in the mobile service data packet and randomize the remaining 3 bytes. The remaining mobile service data excluding the MPEG header is output to the RS encoder/non-system RS encoder 336, without being randomized. In this case, the randomizing process is previously performed by the M-VSB preprocessor 333. Known data (or a known data location holder) included in the mobile service data packet and an initialization data location holder may be randomized or may not be randomized.

The RS encoder/non-systematic RS encoder 336 performs RS encoding process with respect to the data randomized by the data randomizer 335 or bypassed data so as to add a 20-byte RS parity and then outputs the encoded data to the data interleaver 337. At this time, if the received data is the main service data packet, the RS encoder/non-system RS encoder 336 performs a systematic RS encoding process so as to add the 20-byte RS parity to the back of the 187-byte data, similar to an ATSC VSB system. If the received data is the mobile service data packet, the 20-byte RS parity obtained by performing the non-systematic RS encoding process is inserted at the parity byte location decided in the packet.

The data interleaver 337 performs a convolutional interleaving process in the unit of bytes. The output of the data interleaver 337 is input to the parity replacer 338 and the non-systematic RS encoder 339.

The memory of the trellis encoding module 340 may be first initialized such that output data of the trellis encoding module 340 located at the next stage of the parity replacer 338 is set to known data defined by the agreement between the transmitter and the receiver. The memory of the trellis encoding module 340 is first initialized before the received known data sequence is trellis-encoded.

If a start part of the received known data sequence is the initialization data location holder inserted by the M-VSB preprocessor 333, initialization data is generated and is replaced with the trellis memory initialization data location holder immediately before the received known data sequence is trellis-encoded.

The value of the trellis memory initialization data is decided and generated according to the memory status of the trellis encoding module 340. Due to the influence of the replaced initialization data, the RS parity may be calculated again and may be replaced with the RS parity output from the data interleaver 337.

The non-systematic RS encoder 339 receives the mobile service data packet including the initialization data location holder, which will be replaced with the initialization data, from the data interleaver 337 and receives the initialization data from the trellis encoding module 340. The initialization data location holder of the received mobile service data packet is replaced with the initialization data, the RS parity data added to the mobile service data packet is removed, and a new non-systematic RS parity is calculated and is output to the parity replacer 338. Then, the parity replacer 338 selects the output of the data interleaver 337 with respect to the data in the mobile service data packet, selects the output of the non-systematic RS encoder 339 with respect to the RS parity, and outputs the selected data to the trellis encoding unit 340.

If the main service data packet is received or if the mobile service data packet no including the initialization data location holder to be replaced is received, the parity replacer 338 selects and outputs the RS parity and the data output from the data interleaver 337 to the trellis encoding module 340 without alteration.

The trellis encoding module 340 converts the data based on byte units into the data based on symbol units, performs 12-way interleaving, performs the trellis encoding process, and outputs the encoded data to the second transmission data multiplexer 341.

The second transmission data multiplexer 341 inserts a field sync signal and a segment sync signal to the output of the trellis encoding module 340 and outputs the inserted data to the pilot inserter 342. The data into which the pilot is inserted by the pilot inserter 342 is VSB-modulated by the VSB modulator 343 and is transmitted to the broadcasting signal receiver through the RF up-converter 343.

The transmitter transmits various transmission parameters of the transmission signal such as the main service data or the mobile service data and the broadcasting signal receiver needs to receive the transmission parameters of the transmitted signal in order to normally receive the transmitted signal. For example, in order to transmit the mobile service data, information indicating how the signals of the symbol area are encoded is required and information indicating how the main service data and the mobile service data are multiplexed is required. A cell identifier may be required in the multi-frequency network environment. Here, information on the transmission parameter is called signaling information. In the embodiment shown in FIG. 5, the signaling information may be inserted by the preprocessor 333 or the second transmission data multiplexer 341 so as to be transmitted. If the second transmission data multiplexer 341 inserts the signaling information, the signaling information may be inserted into a field sync segment area.

Figure 6:
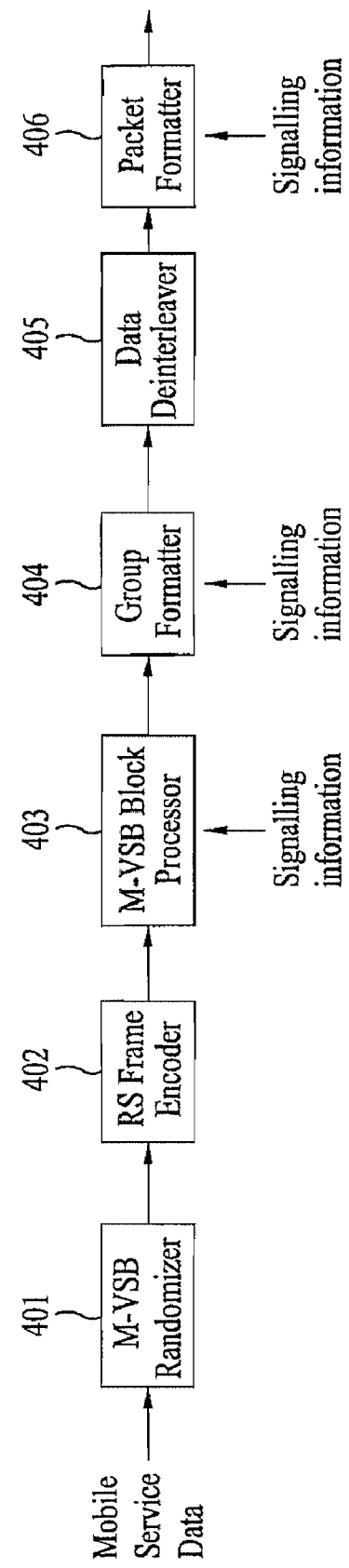
FIG. 6 is a view showing an example of a preprocessor shown in FIG. 5.

FIG. 6 is a view showing an example of the pre-preprocessor shown in FIG. 5. The pre-preprocessor shown in FIG. 6 may include an M-VSB data randomizer 401, a RS frame encoder 402, an M-VSB block processor 403, a group formatter 404, a data deinterleaver 405 and a packet formatter 406.

The M-VSB randomizer 401 randomizes the received mobile service data and outputs the randomized data to the RS frame encoder 402, for error correction encoding. If the M-VSB randomizer 401 randomizes the mobile service data, the data randomizer 335 located at the next stage in FIG. 5 may omit the randomizing process of the mobile service data.

The RS frame encoder 402 performs the error correction encoding process with respect to the randomized mobile service data. If the RS frame encoder 402 performs the error correction encoding process, burst error which may occur by a variation in propagation environment is distributed while making the mobile service data robust so as to cope with the propagation environment which rapidly varies. The RS frame encoder 402 may include a process of mixing mobile service data having a predetermined size in the unit of data rows.

Hereinafter, as one embodiment, the error correction encoding process may be performed by performing the RS encoding method or the cyclic redundancy check (CRC) encoding method. If the RS encoding method is performed, parity data which will be used for error correction is generated and, if the CRC encoding method is performed, CRC data which will be used for error detection is generated.

The RS encoding method may use a forward error correction (FEC) structure. The CRC data generated by the CRC encoding process may indicate whether the mobile service data is damaged by the error while being transmitted through the channel. The error correction encoding process may use other error detection encoding methods other than the CRC encoding method. Alternatively, the overall error correction capability of the receiver can be increased using the error correction encoding method. The mobile service data encoded by the RS frame encoder 402 is input to the M-VSB block processor 403.

The M-VSB block processor 403 encodes the received mobile service data at G/H encoding rate again and outputs the encoded data to the group formatter 404. The M-VSB block processor 403 separates the received mobile service data based on the byte units into data based on bit units, encodes the separated G-bit data to H-bit data, converts the data into data based on byte units, and outputs the data based on byte units. For example, if 1-bit input data is encoded to 2-bit data and the 2-bit data is output, G becomes 1 and H becomes 2. If 1-bit input data is encoded to 4-bit data and the 4-bit data is output, G becomes 1 and H becomes 4. In the present invention, for convenience of description, the former case is called encoding of ½ encoding rate (also called ½ encoding) and the latter case is called encoding of ¼ encoding rate (also called ¼ encoding). The ¼ encoding has higher error correction capability than the ½ encoding. Accordingly, the group formatter 404 may allocate the data encoded at the ¼ encoding rate to an area having low reception capability and allocate the data encoded at the ½ encoding rate to an area having high reception capability, thereby reducing a difference in reception capability.

The M-VSB block processor 403 may receive the signaling information included in the transmission parameter information. The data containing the signaling information may be subjected to the ½ encoding or the ¼ encoding. The signaling information is the information necessary for receiving and processing the data included in the data group by the broadcasting signal receiver and may include cell identifier information, data group information, multiplexing information and burst information.

The group formatter 404 inserts the mobile service data output from the M-VSB block processor 403 into a corresponding area in the data group formed according to a predetermined rule. In conjunction with the data deinterleaving, various types of location holders or known data may be inserted into the corresponding area in the data group. The data group may be separated into at least one layered area and the type of the mobile service data inserted into each area may vary according to the characteristics of the layered area. For example, each layered area may be classified according to the reception capability within the data group.

The group formatter 404 may insert the signaling information such as the transmission parameter information into the data group independent of the mobile service data. When the generated known data is inserted into the corresponding area of the mobile service data group, the group formatter 404 may insert the signaling information into at least a portion of the area into which the known data can be inserted, instead of the known data. For example, if a long known data sequence is inserted into the start part of a body area of the mobile service data group, the signaling information is inserted into a portion of the start part, instead of the known data. In this case, a portion of the known data sequence inserted into the remaining area excluding the area, into which the signaling information is inserted, may be used for capturing the start point of the mobile service data group and the other portion may be used for channel equalization in a reception system.

The group formatter 404 may insert an MPEG header location holder, a non-systematic RS parity location holder and a main service data location holder in conjunction with the data deinterleaving of the next stage, in addition to the encoded mobile service data output from the M-VSB block processor 403.

The reason why the main service data location holder is inserted is because an area in which the mobile service data and the main service data are mixed exists on the basis of the data after the data interleaving. For example, the location holder for the MPEG header is allocated to the foremost location of each packet on the basis of the output data after the data deinterleaving.

The group formatter 404 may insert the known data generated by a predetermined method or insert the known data location holder for inserting the known data later. The location holder for initialization of the trellis encoding module may be inserted into a previous area of the known data sequence. The size of the mobile service data which can be inserted into one data group may vary according to initialization of the trellis inserted into the data group or the size of the known data, the MPEG header and the RS parity.

The data deinterleaver 405 deinterleaves the data and the location holder in the data group output from the group formatter 404 as the inverse process of the interleaving and outputs the deinterleaved data to the packet formatter 406.

The packet formatter 406 may remove the main service data location holder and the RS parity location holder allocated for the deinterleaving, add 1-byte MPEG sync signal to a 3-byte MPEG header location holder with respect to the remaining data portions, and insert a 4-byte MPEG header.

If the group formatter 404 inserts the known data location holder, the packet formatter 406 may include actual known data to the known data location holder and output the known data location holder without adjustment. Then, the packet formatter 406 divides the data in the packet-formatted data group into mobile service data packets (that is, the MPEG TS packets) based on 188-byte units and outputs the divided data to the multiplexer. The packet formatter 406 may insert the signaling information into at least a portion of the known data area instead of the known data and output the inserted data. If the known data location holder is inserted into the start part of the body area of the mobile service data group, the signaling information may be inserted into a portion of the known data location holder.

If the signaling information is inserted, the inserted signaling information may be block-encoded for a short period and may be inserted or a predefined pattern may be inserted according to the signaling information. The body areas of the mobile service data group may have different known data patterns. Accordingly, in the reception system, only symbols in a promised period may be divided from the known data sequence and be recognized as the signaling information.

FIGS. 7 to 10 show the example of transmitting the broadcasting signal of which mobile reception is possible. Hereinafter, a method for transmitting/receiving a broadcasting signal when a broadcasting signal receiver changes a cell and receives the broadcasting signal will be described.

The method for transmitting/receiving the broadcasting signal according to the present embodiment can include a cell identifier in signaling information and transmit/receive the signaling information. Information on a cell for receiving a current broadcasting signal and the other cells, for example, information on a current cell and adjacent cells, may be set in program table information and may be transmitted/received.

The broadcasting signal receiver may determine whether the cell for receiving the broadcasting signal is changed, from the power of the reception signal. If the cell is changed, the broadcasting signal receiver may obtain channel information from the changed cell using the program table information and output the program of the same channel before and after the cell is changed.

The method for transmitting/receiving the broadcasting signal according to the present embodiment can transmit/receive the identifier of the cell using the program table information called the PSI/PSIP or can transmit/receive the identifier of the cell using the signaling information including the transmission parameter information.

If the receiver moves between the cells and the cell information is changed, the PSI or PSIP information may be changed and the receiver can obtain the changed cell information according to the changed program table information. For example, if the PSI or the PSIP information is changed, the broadcasting signal receiver can know that the program table information is updated, through the MGT. The MGT defines the packet identifier (PID) of the PSIP table excluding the STT, a version number and a table size. Accordingly, if the table information in the MGT is changed, the version number of the MGT is changed and thus the changed table can be received again. If the CIT which is the program table information having the cell information is changed, the broadcasting signal receiver can recognize the movement between the cells through the MGT.

FIG. 7 is a view showing table type values defined in the MGT which is the program table information having cell information. The MGT delivers the PID value of the version value of every table excluding the STT. That is, the broadcasting signal receiver checks the version-up of other program table information through the MGT and does not check the version of the table information, thereby reducing the load of the broadcasting system. In the present embodiment, the type of the CIT for delivering the cell information is defined in the MGT so as to check whether the version of the CIT is updated. FIG. 7 shows an example in which the table_type of the CIT is defined by 0x0022. The broadcasting signal receiver can change the channel using the physical channel information of the changed cell using the CIT information and thus the viewer can continuously view the broadcasting program of the channel which has been viewed.

FIG. 8 is a view showing a cell information table (CIT) including channel information of each cell.

The CIT may be transmitted as one piece of section information such as the PSIP and include the channel information of each cell. The version of the CIT may be managed by a master guide table (MGT) similar to the other tables defined in the ATSC A/65.

The MGT defines the PID, the version number and the table size of a PSIP table excluding a system time table (STT). For example, if the information on the PSI or the PSIP is changed, the broadcasting receiver can recognize that the program table information is updated, through the MGT.

Accordingly, if the table information of the MGT is changed, the version number of the MGT is changed and the broadcasting receiver can receive the changed table again. If the broadcasting receiver moves between the cells so as to change the CIT which is the program table information having the cell information, the movement of the broadcasting receiver between the cells can be recognized through the MGT. The broadcasting receiver can change the channel to the channel information of the changed cell using the CIT information, and the user can continuously view the broadcasting program of the channel which has been viewed.

Next, the syntax of the CIT shown in FIG. 8 will be described.

A "table_ID" field is the syntax for identifying the CIT and may be, for example, set to 0xCE. A "section_syntax_indicator" field may be set to 1 and indicates that the section follows the general section syntax. A "private_indicator" field may be set to 1. A "section_length" field is a 12-bit field which indicates the length of the section.

A "transport_stream_id" field is a 16-bit field which includes information for identifying the transport stream. A "version_number" field is a 5-bit field which includes the version information of the CIT. A "current_next_indicator" field is a 1-bit field which may be set to 1. This indicates that the sent table is always applied.

A "section_number" field is an 8-bit field which includes the information on the section number. A "last_section_number" field is an 8-bit field which includes the information on the last section number. A "protocol_version" field is an 8-bit field which includes the version information of the protocol of the table.

A "num_cells_in_section" field is an 8-bit field which includes the information on the number of cells defined in the CIT. The number of cells may be equal to the total number of transmitters to which the broadcasting station transmits the broadcasting signal. The information on all the transmitters to which the broadcasting station transmits the broadcasting signal may be defined in the CIT.

A "cell_id" field is an 8-bit field which includes the cell ID of the transmitter to which the broadcasting station transmits the broadcasting signal. The cell IDs may one-to-one correspond to the transmitters to which the broadcasting station transmits the broadcasting signal. A "cell_text" field is a 7×16-bit field which includes the name information of the transmitter. A "cell_location" field is a 7×16-bit field which includes the information on an area in which the transmitter is located.

A "num_channels_in_cell" field is an 8-bit field which includes the information on the number of channels of the broadcasting station transmitted from the transmitter. For example, in the broadcasting signal transmitted from the broadcasting station including two channels, the "num_channels_in_cell" field is set to 2.

A "major_channel_number" field is a 10-bit field which includes the information on the major channel number of the channel transmitted from the transmitter. A "minor_channel_number" field is a 10-bit field which includes the information on the minor channel number of the channel transmitted from the transmitter. A "modulation_mode" field is an 8-bit field which includes the information on the modulation mode of the channel.

A "carrier_frequency" field is a 32-bit field which includes the information on the carrier frequency for transmitting the broadcasting signal of the channel. A "channel_TSID" field is a 16-bit field which includes the information for identifying the transport stream of the channel. A "program_number" field is a 16-bit field which includes the information on the program number of the channel.

A "descriptor_length" field is a 10-bit field which includes the information on the length of the following descriptor. The descriptor includes three levels such as a descriptor of a channel level, a descriptor of a cell level and a descriptor of a CIT level. A "CRC_32" field is a 32-bit field which includes the code information for correcting an error.

The receiver may obtain the identifier of the changed cell, obtain the signaling information or the EAT from the MGT or the received signal, obtain the channel information of the changed cell from the CIT, and continuously output the broadcasting signal, even when the receiver moves between the cells. When the receiver receives the emergency alert message, the contents of the received emergency alert information may be displayed on a screen or the channel which is currently being viewed may be changed to an emergency alert channel. In the case where the received emergency alert message is displayed on the screen which currently displays a broadcasting program, the channel is not changed and thus a problem does not occur.

However, in the case where the channel which is currently being viewed may be changed to the emergency alert channel, the broadcasting program of the emergency alert channel should not be stopped even when the receiver moves between the cells, in order to continuously output the emergency alert. If the emergency alert status is released even when the receiver moves between the cells, the channel is returned to the original channel which has been viewed.

In order to solve such requirements, the broadcasting station may include the emergency alert channel information of each cell in the CIT including the channel information of each cell and transmit the CIT to the receiver. The cell ID, the emergency alert message contents and the emergency alert channel information are included in the emergency alert table, which is then transmitted to the receiver.

The cell ID and the emergency alert channel information may be defined in the fields of the emergency alert table so as to be transmitted or may be defined in a separate descriptor and included in the emergency information table so as to be transmitted. FIGS. 11 and 12 show examples of transmitting/receiving the emergency information table using the cell ID and the emergency alert channel information.

FIG. 9 is a view showing an example of the MGT for describing a method for transmitting/receiving a broadcasting signal according to an embodiment. Hereinafter, the method for transmitting/receiving the broadcasting signal according to an embodiment will be described with reference to FIG. 9.

In the method for transmitting/receiving the broadcasting signal, if the handover occurs, the broadcasting signal receiver checks the version number of the MGT so as to recognize the change of the cell. FIG. 9 shows an example of defining the cell identifier defined in the CIT in the reserved field of the MGT. In addition to the field shown in FIG. 9, the cell identifier defined in the CIT may be configured by various methods.

In FIG. 9, the "cell_id" field is located next to the "table_id_extension" field of the MGT and includes the index of the cell included in the CIT. The MGT configures a "table_type" field with respect to a "table_defined" field. The broadcasting signal receiver can check whether the program table information described in FIG. 7 is updated or changed according to the "table_type" field. A "table_type_PID" field configures the PID of the packet for delivering the "table_type" field.

The broadcasting signal receiver can obtain the channel information according to the "cell_id" field defined in the MGT through the CIT information shown in FIG. 12 in the program table information.

The broadcasting signal receiver may parse the MGT which is one of the program table information, obtain the current cell ID, find the cell ID of the CIT having the same cell ID as the cell ID of the MGT, and obtain the channel information of the changed cell. If the broadcasting signal receiver moves to another cell, the MGT is received again and the transport stream information of the CIT using the cell ID of the MGT as the index is updated. Accordingly, the channel information such as "major_channel_number", "minor_channel_number", "modulation mode" (for example, QAM, VSB, etc.), "carrier_frequency", and "program number" field configured in the CIT can be obtained.

FIG. 10 is a view showing an example of a descriptor for describing a method for transmitting/receiving a broadcasting signal according to another embodiment. Hereinafter, the method for transmitting/receiving the broadcasting signal according to another embodiment will be described with reference to FIG. 10.

In FIG. 10, the "cell_id" field may be delivered through the descriptor included in the MGT. In FIG. 10, the descriptor for parsing the "cell_id" field from the MGT is called a "cell_link_descriptor" field. The descriptor shown in FIG. 10 may be parsed from the descriptor of the MGT shown in FIG. 9. The descriptor for parsing the "cell_id" field shown in FIG. 10 may include a "descriptor_tag" field of 0×AB, a "descriptor_length" in byte units, a "cell_id" field, and a "reserved" field.

If the "cell_id" field is parsed from the descriptor of the MGT which is updated at the time of occurrence of handover, the broadcasting signal receiver can obtain the channel information of the changed cell using the same "cell_id" field included in the CIT.

FIG. 11 is a view showing the syntax of the emergency alert table. Now, the syntax configuring the EAT shown in FIG. 11 will be described.

A "table_ID" field is the syntax for displaying the emergency alert message table and may be, for example, set to 0×D8. A "section_syntax_indicator" field may be set to 1 and indicates that the section follows the general section syntax. A "section_length" field defines the number of bytes which remain in the section and may be set to be less than 4093.

A "table_id_extension" field includes the extension information of the "table_id" field and may be set to 0×0000. A "sequence_number" field indicates the sequence of the emergency alert message and may be increased from 0 to 31 if the semantic of the message is changed. This field may indicate the version of the emergency alert message.

A "current_next_indicator" field is a 1-bit field which may be set to 1. This field indicates that the sent table is always applied. A "section_number" field is an 8-bit field which includes the information on the section number and may be set to 0×00dmfh. A "last_section_number" field is an 8-bit field which includes the information on the last section number. A "protocol_version" field is an 8-bit field which includes the version information of the PSIP protocol which is the protocol of the above-described table.

An "EAS_originator_code" field indicates the entity for generating the emergency alert system (EAS). An "EAS_event_code_length" field indicates the length of the "EAS_event_code". An "EAS_event_code" field includes the information indicating the type of the EAS, for example, the type of the emergency such as an earthquake, a flood or a terrorist threat or the emergency information such as a strong earthquake, a medium earthquake and a weak earthquake.

A "nature_of_activation_text_length" field indicates the length of "nature_of_activation_text". For example, if the value of the value of the "nature_of_activation_text_length" field is "0", it is indicated that the "nature_of_activation_text" field is not included in the emergency alert message.

A "nature_of_activation_text" field may include a specific syntax indicating the textual representation of the event code displayed on the screen. For example, when an earthquake occurs, a message "occurrence of earthquake" which will be displayed on the screen may be included.

An "alert_message_time_remaining" field indicates the residual output time of the emergency alert message. For example, the residual output time may be set in the unit of 0 to 120 seconds and, if the field value is 0, the output time may indicate an infinite duration. Alternatively, the "alert_message_time_remaining" field may indicate the duration time during when the emergency alert message which is an interrupt service is displayed until original broadcast service returns, in second units. That is, this field indicates the time during when the message is output.

An "event_start_time" field may indicate the start time of the EAM event after 00 hours UTC, Jan. 6, 1980 in second units.

The start time of the EAM event is compared with the STT time of the channel on the basis of the GPS time, and the broadcasting receiver ignores the EAT if the start time of the EAM event is earlier than the STT time of the channel. In contrast, if the start time of the EAM event is later than the STT time of the channel, the start time of the EAM event is compared with the value of the "event_duration" field so as to determine whether the start time of the EAM event will be loaded to the memory of the broadcasting receiver. The "event_duration" field indicates the duration of the emergency alert event in minute units. A zero value may indicate that it is not determined how long the EAM event is maintained.

The broadcasting receiver may delete a past emergency alert event, which is stored in the memory of the broadcasting receiver but is no longer necessary, using the "event-start-time" field and the "event_duration" field. An "alert_priority" field may indicate the syntax for displaying the priority or the importance of the emergency.

Table 1 shows the example of the meaning corresponding to the value of the "alert_priority" field according to the present invention.

TABLE 1

| Alert Priority | Meaning | Channel Tuning |
|---|---|---|
| 0 | Test Message | X |
| 1-7 | Reserved | X |
| 8 | Medium Priority: Message Scrolling | X |
| 9-14 | Reserved | X |
| 15 | High Priority: Message Scrolling and Channel Tuning | ○ |

As shown in Table 1, for example, if the priority is "0", the broadcasting transmitter may transmit only a test message and, if the priority is "8", information for controlling the message related to the emergency to be scrolled on the screen of the broadcasting receiver may be transmitted.

If the priority is "15", that is, if the priority is highest, the information for controlling the message related to the emergency to be scrolled on the screen of the broadcasting receiver may be transmitted and information for forcedly tuning the channel to a specific channel for reporting the news related to the emergency may be transmitted. The specific channel may be, for example, the existing broadcasting channel or may be set to a broadcasting channel with a new frequency in a new cell. The above-described values are only exemplary.

A "details_channel_source" field clearly defines whether the broadcasting channel of the emergency alert message is an analog channel or a digital channel. For example, the channel type of the emergency broadcasting program according to the value of the "details_channel_source" field may be defined as shown in Table 2.

TABLE 2

| Value | Meaning |
|---|---|
| 0x00(00) | [Reserved for future use] |
| 0x01(01) | Analog channel |
| 0x02(10) | Digital channel |
| 0x03(11) | [Reserved for future use] |

For example, if the value of the "details_channel_source" field is "00" or "11", "reserved for future use" may be defined, if the value of the "details_channel_source" field is "01", the analog channel may be defined, and, if the value of the "details_channel_source" field is "10", the digital channel may be defined. In this case, even when the minor channel number is 0, it is easily determined whether the emergency channel is the analog channel or the digital channel by Table 2.

An "alert_text_length" field includes the information on the total byte number of the "alert_text( )" field. For example, if the value of the "alert_text_length" field is 0, it is indicated that the "alert_text( )" field is not included in the emergency alert message.

An "alert_text_rate" field indicates the scroll rate of scroll data parsed in the "alert_text( )" field, that, the emergency alert contents. At this time, the scroll rate may be decided to an adequate rate for allowing a viewer to easily recognize the scroll data by referring to the scroll data size (that is, the value of the "alert_text_length" field) and the emergency alert message duration (that is, the value of the "alert_message_time_remaining" field).

Alternatively, the "alert_text_rate" field may include information for differently setting the scroll rate of the text containing the emergency alert message according to the value of the field ("alert_priority") for indicating the importance of the emergency. For example, 16 bits are allocated to the "alert_text_rate" field and the scroll rate may be represented by an unsigned integer number (uimsbf). At this time, a time period from a time point when a first character starts to be scrolled to a time point which the character disappears from the screen may be described as the scroll rate in second units. Alternatively, time period from a time point when a first character of the emergency contents starts to be scrolled to a time point when the scrolling of a last character thereof is finished may be described in second units. An "alert_text( )" field may become a data field including a specific syntax (for example, "multiple_string_structure( )" or the like) for representing the textual description of the emergency alert on the on-screen-display (OSD). The emergency alert text may be set to be slowly scrolled from bottom to top or the right to the left of the screen of the broadcasting receiver.

A "location_code_count" field counts the region definition which follows "for loop" and the value thereof may be an integer number from 1 to 31.

A "country_code" field is an 8-bit field which indicates the country code related to the emergency. Since the "country_code" field having 8 bits can theoretically represent 256 countries, it is possible to sufficiently specify about 210 to 220 countries which exist currently. The number, 8, of bits allocated to the "country_code" field is only exemplary and the number of bits may be less than or greater than 8. That is, the number of bits allocated to the "country_code" field may be selected by a designer.

A "state_code" field represents a state or a territory related to the emergency and may have a value of 0 to 99. The "state_code" field may be coded according to the FIPS number codes of the state and the territory and, if the value of the field is 0, it is indicated that every state is in the emergency.

A "state_subdivision_code" field defines state division. A "county_code" field represents a specific county of the state related to the emergency. The "county_code" field may be coded according to the FIPS number codes of the state and the territory and, if the value of the field is 0, it is indicated that every county is in the emergency.

Although the regional name of the administrative division of the United States is used in the regional definition, the regional name is not intended to restrict the scope of the present invention and is only exemplary.

An "exception_count" field counts an exception service which follows 'for loop'. If an "exception_major_channel_number" field is not 0, the major channel number of the exception service associated with in-band service information (SI) may be expressed. If an "exception_minor_channel_number" field is not 0, the minor channel number of the exception service associated with the in-band SI may be represented. A "descriptors_length" field includes the information on the length of the following descriptor. A "CRC_32" field is a 32-bit field which includes the code information for correcting an error.

FIG. 12 is a view showing an example of the syntax of the descriptor including the emergency alert broadcasting channel information. The descriptor may be included in an EAT table shown in FIG. 11 so as to be transmitted.

A "descriptor_tag" field includes the identifier for identifying the descriptor. The value of the field may be, for example, set to 0×EA. A "descriptor_length" field may include the information on the length of the descriptor.

A "cell_ID" field may include the cell ID of the current cell which transmits the emergency alert broadcasting signal. A "details_major_channel_number" field may include information on the major channel number of the emergency alert broadcasting channel. A "details_minor_channel_number" field may include information on the minor channel number of the emergency alert broadcasting channel.

A "carrier_frequency" field is a 32-bit field which may include information on the carrier frequency for transmitting the broadcasting signal of the emergency alert broadcasting channel.

A "details_channel_program_Number" field may include information on the program number of the emergency alert broadcasting channel.

A "details_channel_tsID" field is a 16-bit field which may include information for identifying the transport stream of the emergency alert broadcasting channel.

FIG. 13 is a view showing the syntax of an emergency alert table including the emergency alert broadcasting channel information.

In the emergency alert table shown in FIG. 13, the information included in the emergency alert descriptor shown in FIG. 11 is defined in fields of the table. The description of the fields of the emergency alert table shown in FIG. 13 is equal to that of the fields of FIG. 11.

A packet identifier (PID) of the EAT may be set such that the PID and the version number are managed by the MGT or may have a fixed PID which is not managed by the MGT. In the former case, the broadcasting receiver cannot immediately check the EAT in numerous tables of the PSIP data and can obtain the EAT by checking the PID defined in the MGT. In the latter case, the EAT can be identified by the PID of the EAT and the cell ID can be obtained from the identified EAT.

If the emergency alert tables shown in FIGS. 11 to 13 are used, it is possible to continuously view the emergency alert message or the emergency alert channel although the broadcasting receiver moves between the cells. Although the receiver moves between the cells, if the emergency alert status is cancelled, the channel can be returned to the original channel which has been viewed.

For example, it is assumed that the broadcasting receiver receives the broadcasting signal from the cell A. If the emergency alert tables shown in FIGS. 11 to 13 are received while the broadcasting signal is received from the cell A, the broadcasting receiver outputs the emergency alert message included in the emergency alert table on the screen or tunes the channel to the emergency alert channel.

If the broadcasting receiver moves from the cell A to the cell B while the emergency alert message is output on the screen, the cell ID is obtained. The cell ID can be obtained from the signaling information of the received signal, the MGT, or the EAT, as described above. The cell B is identified by the obtained cell ID and the channel information for outputting the emergency alert message is obtained from the channel information of the cell B included in the CIT. The emergency alert table can be received from the cell B and the emergency alert message can be output on the screen.

At this time, if the emergency is cancelled, the broadcasting receiver can tune the channel to the original channel which has been viewed or output the original program which has been viewed. When the emergency alert is finished, the broadcasting receiver can check through which channel of the cell B the channel or the program, which has been received from the cell A, is received, using the cell ID of the current (cell B) and the channel information of the CIT. Accordingly, even when the emergency alert is finished after the cell is changed, the channel which has been received from the cell A can be received from the cell B.

Figure 14:
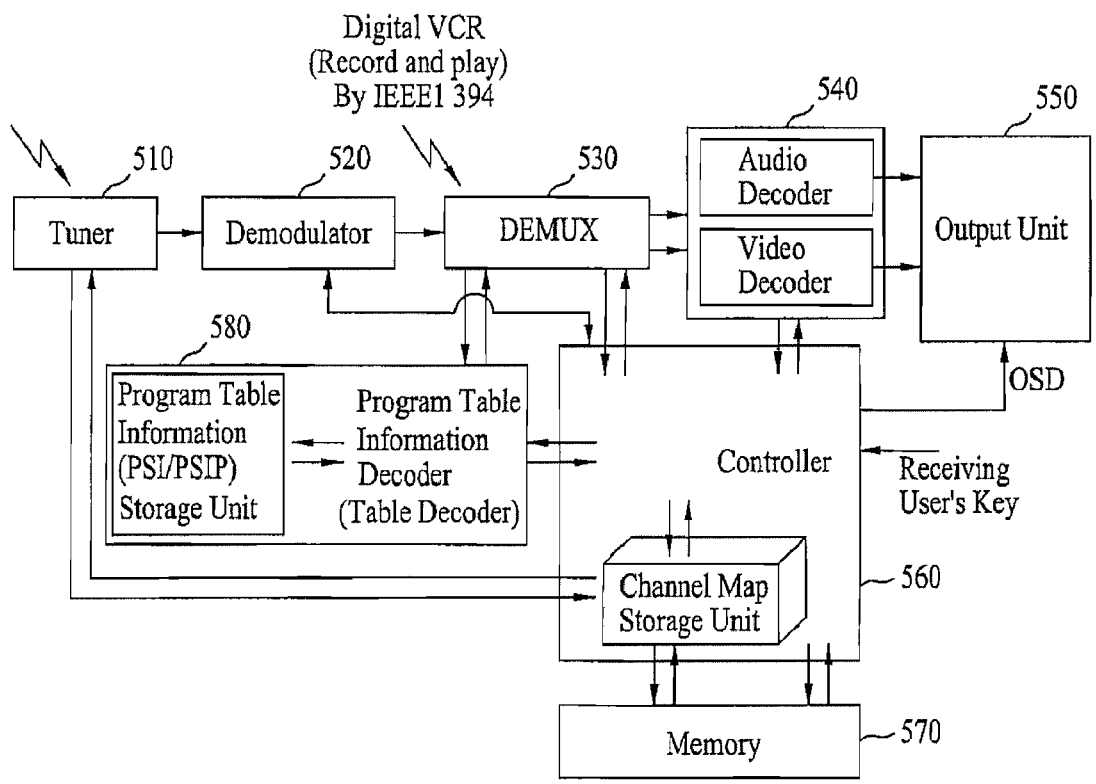
FIG. 14 is a block diagram showing a broadcasting receiver according to an embodiment

FIG. 14 is a view showing a broadcasting signal receiver according to an embodiment. The broadcasting signal receiver shown in FIG. 17 includes a tuner 510, a demodulator 520, a demultiplexer 530, a decoder 540, an output unit 550, a controller 560, a memory 570, and a program table information decoder 580.

The operation of the broadcasting signal receiver according to the present embodiment will be described with reference to FIG. 14.

The tuner 510 receives the broadcasting signal including the cell information and selects and outputs the broadcasting signal of a channel according to a control signal of the controller 560 among the broadcasting signals received from the current cell.

The demodulator 520 may demodulate and output the received signal. The signaling information including the cell information may be output and transmitted to the controller 560. The demodulator 520 will be described in detail with reference to FIG. 15.

The demultiplexer 530 may demultiplex program table information (PSI/PSIP) and an audio/video stream in the received signal. Alternatively, a broadcasting stream which will be recorded in or reproduced from a digital recording device may be received. For example, an input signal according to the IEEE1394 may be directly received without the tuner.

The decoder 540 may decode the audio/video broadcasting signal demultiplexed by the demultiplexer 530. The decoder 540 decodes the audio/video elementary stream packet and outputs the decoded audio/video signal to the output unit 550.

The output unit 550 receives and outputs the audio/video signal decoded by the decoder 540. The output unit 550 includes an on-screen-display (OSD) unit for outputting a graphic signal displayed on a display screen.

The program table information decoder 580 may decode the program table information demultiplexed by the demultiplexer 530 and temporarily store the decoded table information. The program table information decoder may parse the table including the cell information, that is, the MGT, extract the cell information, and output the obtained cell information to the controller 540.

The controller 560 includes an interface for receiving the control signal from the user. The controller 560 stores channel map information in which a physical channel and a virtual channel are mapped such that the tuner 510 selects the channel, and controls the decoder 540 such that the broadcasting stream is output according to the channel request of the user. If the program table information decoder 580 parses the updated table information, the controller 560 stores the updated channel information in the channel map. The controller 560 may store other control information including information necessary for the handover of the broadcasting signal receiver, information on an application and the request information of the user in the memory 570.

When the program table information decoder 580 extracts the cell information, the controller 560 may obtain the channel information of the changed cell using the CIT information decoded by the program table information decoder 580. The controller 560 controls the tuner 510 to tune the channel information of the changed cell such that the broadcasting contents received from the previous cell are output. The controller 560 may control the demodulator 520, the demultiplexer 530 and the decoder 540 to process the tuned signal.

The CIT and EAT table demultiplexed by the demultiplexer 50 is output to the program table information decoder 580. The program table information decoder 580 collects, sections having the same table ID (table_id), parses the table, and stores the parsed result in the program table information storage unit.

Meanwhile, the controller 560 may operate an application manager, execute a native application program stored in the memory 570 and perform a general function such as channel switching. The native application program indicates software which is installed at the time of shipment of the reception system. If the reception system receives the user's request through a user interface (UI), the controller 560 displays information corresponding to the user's request on the screen through a graphic user interface (GUI).

The application manager controls a channel manager so as to perform a channel-related operation, that is, the management of a channel map, and controls the program table information decoder 580.

If the EAT information is received, the application manager controls a text related to the emergency to be output on the screen according to the parsed EAT information. The application manager determines whether the received EAT information is equal to the EAT information which is most recently received and does not process the received EAT information if it is determined that the received EAT information is equal to the EAT information which is most recently received.

While the text related to the emergency is output on the display unit (not shown), the size, contrast, or color of the text may be adjusted using the value of an "alert_priority" field included in the EAT.

For example, if the value of the "alert_priority" field is 8, a text having a relatively small size can be output and, if the value of the "alert_priority" field is 15, a text having a relatively large size can be output since an important emergency occurs.

Alternatively, if the value of the "alert_priority" field is 8, a text having relatively low contrast can be output and, if the value of the "alert_priority" field is 15, a text having relatively high contrast can be output since an important emergency occurs. The application manager controls the channel manager and the tuner such that the channel is forcedly tuned to the emergency alert channel according to the "alert_priority" field.

As described above, the emergency channel may be the existing broadcasting channel or a special frequency channel which is operated only in an emergency.

The application manager may store the cell ID of the cell from which the broadcasting signal has been received and the channel information of the channel which has been viewed, before tuning the channel to the emergency alert channel. If the emergency is cancelled, the application manager may return the channel to the channel which has been viewed, using the channel information of the channel and the cell ID, both of which are stored in the memory 570.

If it is determined that the cell ID of the cell in which the broadcasting receiver is located and the stored cell ID are different from each other at the time of cancellation of the emergency, the application manager analyzes the CIT and the channel information of the channel map storage unit and returns the channel to the original channel in which the original program the user has viewed has been transmitted, using the channel information of the cell.

The controller 560 may operate the system manager. The system manager may control booting of the reception system by turning on/off the power source and store a downloaded software image in the memory 570. The memory 570 stores an operating program such as an operating system necessary for operating the reception system and an application program for performing a data service function.

The operating program and the application program stored in the memory 570 may be updated or corrected to a newly downloaded program. Since the operating program and the application program are not erased and are stored even when the supply of the power is stopped, the operating program and the application program may be executed without performing a downloading operation, when the power is applied.

The controller 560 may operate a data broadcasting application manager. If a data service is requested by the UI, the data broadcasting application manager executes the application program stored in the memory 570, processes the requested data, and provides the data service to the user.

Figure 15:
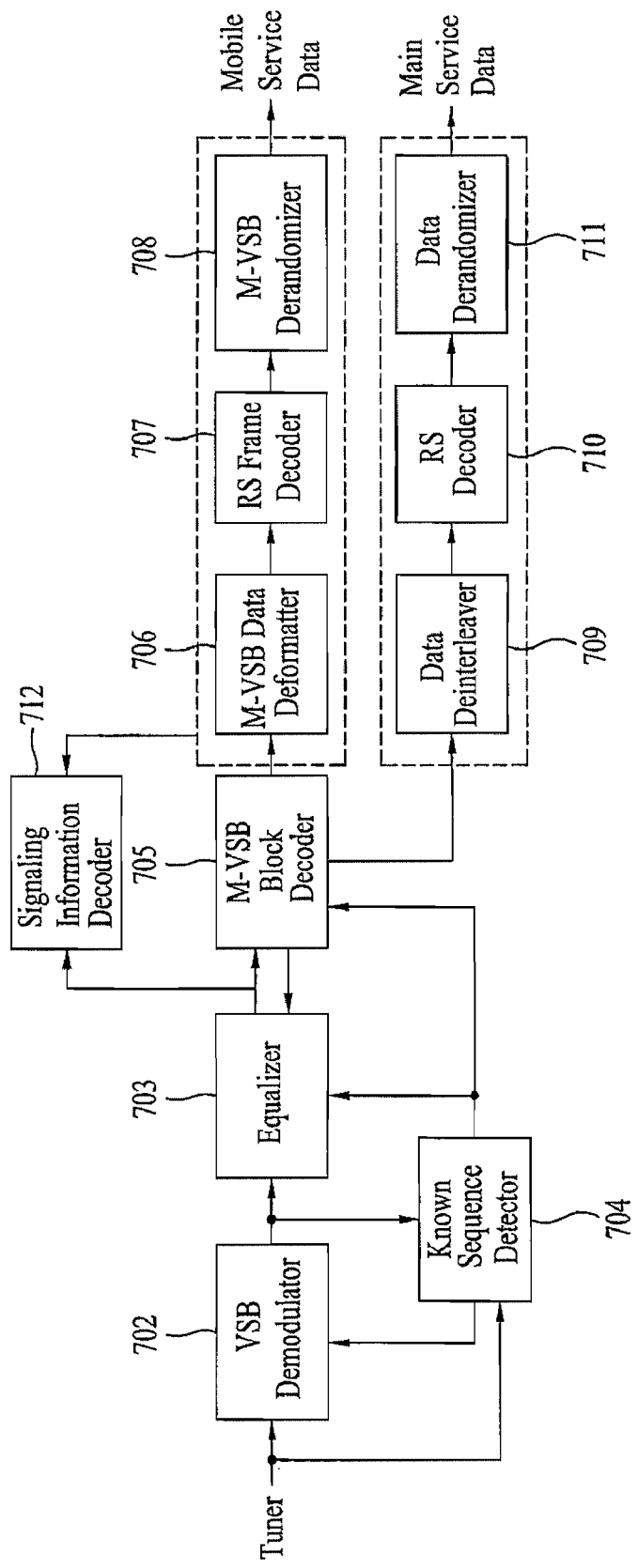
FIG. 15 is a example of a demodulator of the broadcasting receiver in FIG. 14.

FIG. 15 is a view showing an example of the demodulator in the broadcasting signal receiver according. FIG. 15 shows the component for decoding the broadcasting signal when the broadcasting signal is transmitted as shown in FIGS. 2 to 6. Hereinafter, the demodulator of the present embodiment will be described with reference to FIG. 15.

The broadcasting signal receiver restores a carrier sync signal, restores a frame sync signal and performs channel equalization using the known data information inserted in the mobile service data period in a transmission system, thereby improving reception capability.

The broadcasting signal receiver includes a VSB demodulator 702, an equalizer 703, a known sequence detector 704, an M-VSB block decoder 705, an M-VSB data deformatter 706, a RS frame decoder 707, an M-VSB derandomizer 708, a data deinterleaver 709, a RS decoder 710, a data derandomizer 711, and a signaling information decoder 712. In FIG. 15, for convenience of description, the M-VSB data deformatter 706, the RS frame decoder 707, and the M-VSB derandomizer 708 are collectively called a mobile service data processor and the data deinterleaver 709, the RS decoder 710 and the data derandomizer 711 are collectively called a main service data processor.

The VSB demodulator 702 and the known sequence detector 704 receive the signal of which the frequency is tuned by the tuner and is down-converted into an intermediate frequency (IF).

The VSB demodulator 702 performs the automatic gain control, the recovery of a carrier and the restoration of a timing in consideration of the VSB method so as to convert the received IF signal to a baseband signal, and outputs the baseband signal to the equalizer 703 and the known sequence detector 704.

The equalizer 703 compensates for the distortion on the channel included in the demodulated signal and outputs the compensated signal to the M-VSB block decoder 705.

At this time, the known sequence detector 704 detects the location of known data inserted at the transmitter side from the input/output data of the VSB demodulator 702, that is, the data before the VSB demodulation or the data after the demodulation. The known sequence detector 704 outputs the location information and the symbol sequence of the known data generated at the location to the VSB demodulator 702 and the equalizer 703. The known sequence detector 704 outputs information for allowing the M-VSB block decoder 705 to distinguish the mobile service data, which is subjected to the additional error correction encoding at the transmitter side, and the main service data, which is not subjected to the additional error correction encoding, to the M-VSB block decoder 705. Although the connection state is not shown in FIG. 14, the information detected by the known sequence detector 704 can be used in the receiver and can be used in the M-VSB data deformatter 706 and the RS frame decoder 707.

The VSB demodulator 702 can improve demodulation capability using the known data symbol sequence at the time of the restoration of the timing or the recovery of the carrier and the equalizer 703 can improve equalization capability using the known data. The decoded result of the M-VSB block decoder 705 may be fed back to the equalizer 703 so as to improve the equalization capability.

If the data received from the equalizer 703 is the mobile service data which is subjected to the additional error correction encoding and the trellis encoding at the transmitter side, the M-VSB block decoder 705 performs trellis decoding and additional error correction decoding as the inverse processes of the transmitter side. If the data is the main service data which is not subjected to the additional encoding and is subjected to the trellis encoding at the transmitter side, only the trellis decoding is performed.

The data group decoded by the M-VSB block decoder 705 is input to the M-VSB data deformatter 706 and the main service data packet is input to the data deinterleaver 709.

If the received data is the main service data, the M-VSB block decoder 705 may perform viterbi decoding with respect to the received data and output a hard decision value or a soft decision value.

If the received data is the mobile service data, the M-VSB block decoder 705 outputs the hard decision value or the soft decision value with respect to the received mobile service data. If the received data is the mobile service data, the M-VSB block decoder 705 decodes the data which is encoded by the M-VSB block processor and the trellis encoder of the transmission system. In this case, the RS frame encoder of the M-VSB preprocessor of the transmitter side may become an outer code and the M-VSB block processor and the trellis encoder may become an inner code. The decoder of the inner code may output the soft decision value such that the capability of the outer code can be maximized at the time of the decoding of the concatenated code.

Accordingly, the M-VSB block decoder 705 may output the hard decision value with respect to the mobile service data and preferably may output the soft decision value if necessary.

The data deinterleaver 709, the RS decoder 710 and the derandomizer 711 receive and process the main service data. The data deinterleaver 709 deinterleaves the main service data output from the M-VSB block decoder 705 as the inverse process of the data interleaver of the transmitter side and outputs the deinterleaved data to the RS decoder 710.

The RS decoder 710 performs systematic RS decoding with respect to the deinterleaved data and outputs the decoded data to the derandomizer 711. The derandomizer 711 receives the output of the RS decoder 710, generates the same pseudo random byte as the randomizer of the transmitter, performs a bitwise exclusive OR (XOR) with respect to the pseudo random byte, inserts the MPEG sync data in front of every packet, and outputs 188-byte main service data in the packet units.

The data output from the M-VSB block decoder 705 to the M-VSB data deformatter 706 has a data group form. At this time, since the M-VSB data deformatter 706 already knows the configuration of the received data group, it is possible to distinguish the mobile service data and the signaling information having the system information within the data group. The signaling information indicates information for delivering the system information and can deliver the information on the transmission parameter including the identifier of the cell.

The mobile service data is output to the RS frame decoder 707 and the M-VSB data deformatter 706 removes the known data inserted into the data group and the main service data, the trellis initialization data, the MPEG header and the RS parity added in the RS encoder/non-systematic RS encoder or the non-systematic RS encoder of the transmission system and outputs the mobile service data to the RS frame decoder 707.

That is, the RS frame decoder 707 receives only the mobile service data which is subjected to the RS encoding and/or CRC-encoding, from the M-VSB data deformatter 706.

The RS frame decoder 707 performs the inverse process of the RS frame encoder of the transmission system, corrects errors in the RS frame, adds a 1-byte MPEG sync signal which is removed in the RS frame encoding process to the error-corrected mobile service data packet, and the added mobile service data to the M-VSB derandomizer 708.

The M-VSB derandomizer 708 performs the derandomizing process corresponding to the inverse process of the M-VSB randomizer of the transmission system with respect to the received mobile service data and outputs the derandomized data, thereby obtaining the mobile service data transmitted from the transmission system.

The signaling information decoder 712 may decode the signaling information included in the received signal. FIG. 15 shows an example of decoding the signaling information including the identifier of the cell from the M-VSB data deformatter 706 or the equalizer 703 according to the location of the signal carried in the signaling information.

Figure 16:
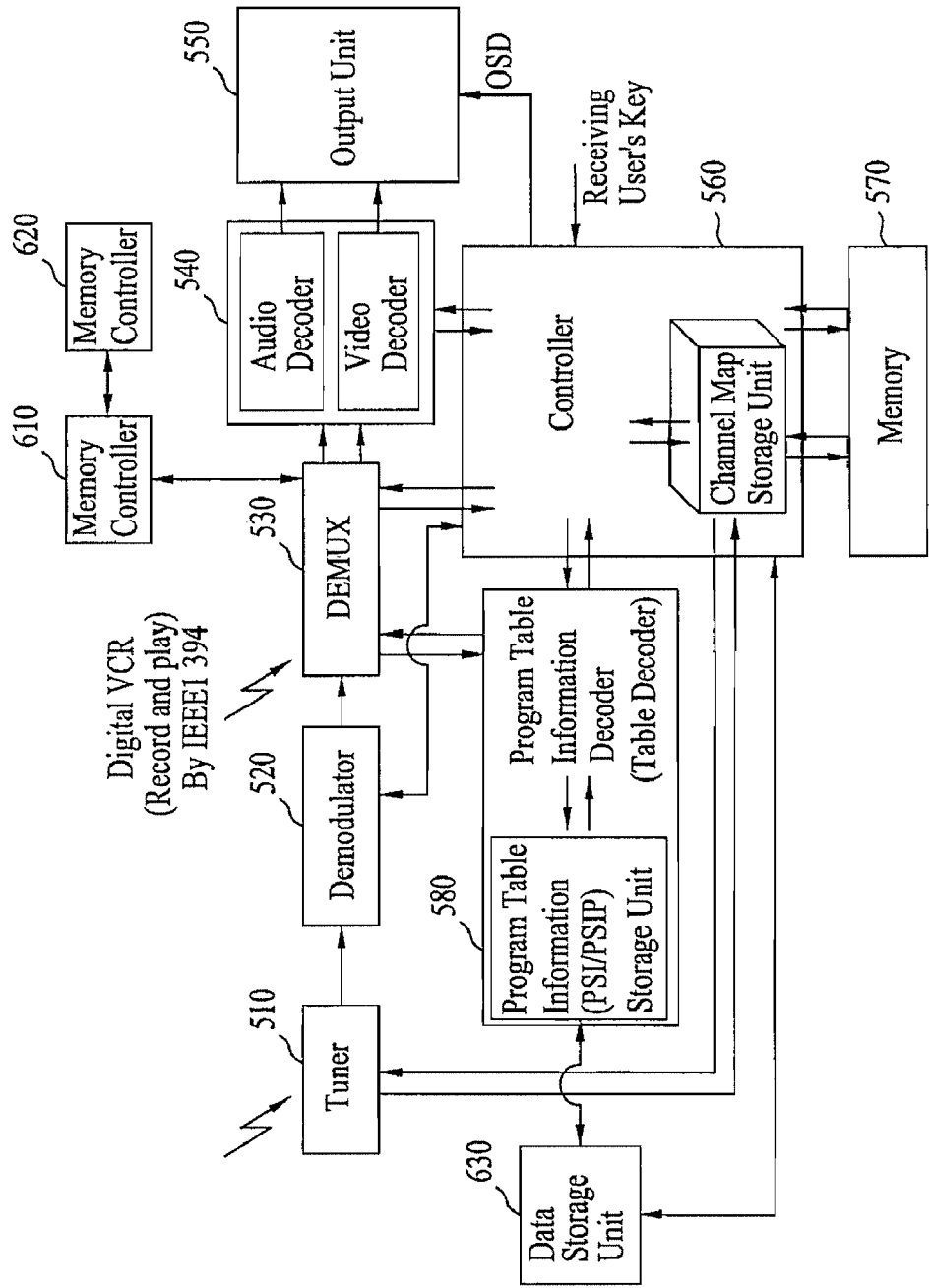
FIG. 16 is a block diagram showing a broadcasting receiver according to another embodiment.

FIG. 16 is a view showing a broadcasting signal receiver according to another embodiment.

The broadcasting signal receiver according to the present embodiment further includes a second memory 620 for storing a program and a memory controller 610 for controlling the second memory 620, in addition to the memory 570 of the broadcasting signal receiver shown in FIG. 14.

The broadcasting service data demultiplexed by the demultiplexer 530 may be decoded by the decoder 540 and may be output and may be input to or read from the second memory 620 by the memory controller 610 for controlling the second memory 620. The demultiplexer 530 may store the main service data or the mobile service data demodulated by the demodulator 520 in the second memory 620.

The controller 560 may control an instant recording function, a reservation recording function, and a time shift function of the broadcasting service data demultiplexed by the demultiplexer 530 through the memory controller 610. The controller 560 may reproduce the broadcasting service data which is already stored in the second memory 620 through the memory controller 610 and the demultiplexer 530.

The second memory 620 may be divided into a temporary storage area for storing the data according to the time shift and a permanent storage area for permanently storing the data according to the selection of the user.

The memory controller 610 may control a play function, a fast forward function, a rewind function, a slow motion function and an instant replay function of the data stored in the second memory 620 according to the control signal of the controller 560. Here, the instant replay function is a function for repeatedly viewing a desired scene. The data which is currently being received in real time as well as the data which is previously stored can be instantly replayed in conjunction with the time shift function.

The memory controller 610 may scramble and store the received data in order to prevent the unauthorized copy of the data stored in the second memory 620. In contrast, the memory controller 610 may read, descramble and store the data which is scrambled and stored in the second memory 620.

If the broadcasting data for data broadcasting is included in the main service data or the mobile service data, the program table information decoder 580 may decode the broadcasting data. The data for data broadcasting may be decoded by the program table information decoder 580 and may be stored in a data storage unit 630.

If the controller 560 operates a data broadcasting application according to the request of the user, the program table information decoder 580 decodes the broadcasting data for data broadcasting and outputs the decoded broadcasting data. The application operated by the controller 560 may implement the data broadcasting output from the program table information decoder 580 and output it to the output unit 550.

The program table information decoder 580 may decode, for example, the service information such as DVB-SI or the broadcasting data according to the PSI or the PSIP. The broadcasting data for data broadcasting may be of a packetized elementary stream type or a section type. That is, the data for data broadcasting includes PES type data or section type data.

For example, the data for data broadcasting is included in a digital storage media-command and control (DSM-CC) section and the DSM-CC section may be composed of the TS packet based on 188-byte units. The identifier of the TS packet included in the DSM-CC section is included in the program table information which is a data service table (DST). If the DST is transmitted, 0×95 is allocated as the value of a stream_type field in the service location descriptor of the PMT or the VCT. The broadcasting signal receiver determines that the data for data broadcasting is received if the value of the stream-type field of the PMT or the VCT is 0×95. The data for data broadcasting may be transmitted by a data carousel method.

In order to process the data for data broadcasting, the demultiplexer 530 may perform section filtering under the control of the program table information decoder 580, discard the overlapping section, and output the non-overlapping section to the program table information decoder 580. The program table information decoder 580 can determine whether the data for data broadcasting included in the broadcasting signal is received according to the PID of the VCT. The PID of the VCT may be set in an MGT and have a fixed value.

The demultiplexer 530 may output only an application information table (AIT) to the program table information decoder 580 through the section filtering. The AIT includes information on an application executed on the broadcasting signal receiver, for the data service.

The AIT may include the information on the application, for example, the name of the application, the version of the application, the priority of the application, the ID of the application, the status of the application (auto-start, operability of the user, kill or the like), the type of the application (Java or HTML), the class of the application, the location of the stream including a data file, the base directory of the application, and the location of the icon of the application. Accordingly, information necessary for executing the application may be stored in the data storage unit 630 using the above-described information.

The application executed by the controller 560 may be received together with the broadcasting data and may be updated. A data broadcasting application manager which is executed in order to allow the controller 560 to execute the application may include a platform for executing an application program. The platform may be, for example, the Java virtual machine for executing the Java program.

If it is assumed that the data broadcasting service is a traffic information service, the broadcasting signal receiver can provide the service to the users through at least one of characters, voice, graphics, still images, moving images or the like although an electronic map or a global positioning system (GPS) module is not mounted. If the broadcasting signal receiver includes the GPS module, the data broadcasting application may be implemented after the GPS module extracts current location information (longitude, latitude, and altitude) received from a satellite. The data storage unit 630 of the broadcasting signal receiver 630 may store the electronic map including information on links and nodes and a variety of graphic information.

Figure 17:
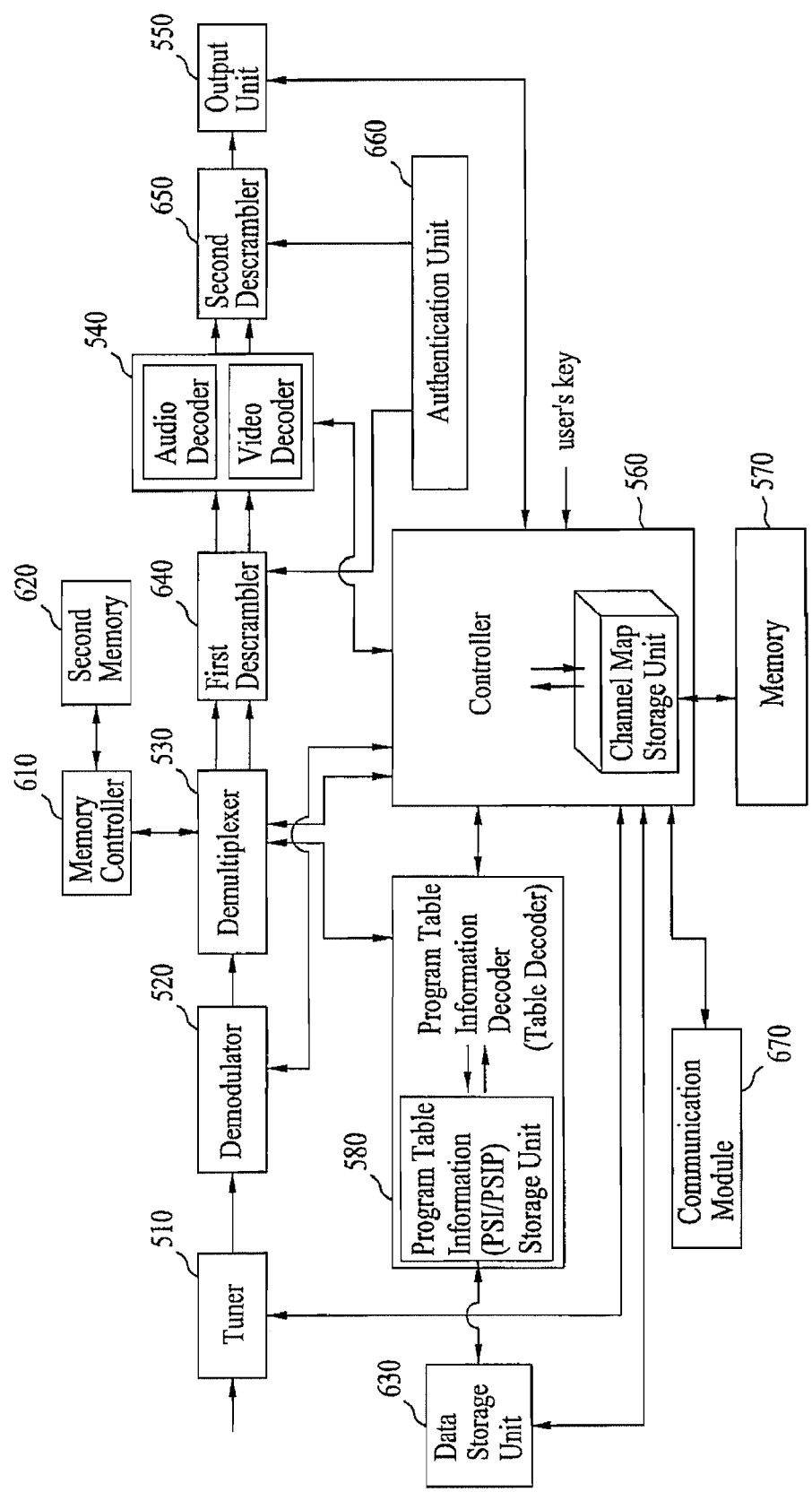
FIG. 17 is a block diagram showing a broadcasting receiver according to another embodiment.

FIG. 17 is a view showing a broadcasting signal receiver according to another embodiment. Hereinafter, the operation of the broadcasting signal receiver according to the present embodiment will be described with reference to FIG. 17.

The broadcasting signal receiver according to the present embodiment further includes a second memory 620 for storing a program and a memory controller 610 for controlling the second memory 620, in addition to the memory 570 of the broadcasting signal receiver shown in FIG. 14.

The broadcasting service data demultiplexed by the demultiplexer 530 may be decoded by the decoder 540 and may be output and may be input to or read from the second memory 620 by the memory controller 610 for controlling the second memory 620. The demultiplexer 530 may store the main service data or the mobile service data demodulated by the demodulator 520 in the second memory 620.

The controller 560 may control an instant recording function, a reservation recording function, and a time shift function of the broadcasting service data demultiplexed by the demultiplexer 530 through the memory controller 610. The controller 560 may reproduce the broadcasting service data which is already stored in the second memory 620 through the memory controller 610 and the demultiplexer 530.

The second memory 620 may be divided into a temporary storage area for storing the data according to the time shift and a permanent storage area for permanently storing the data according to the selection of the user.

The memory controller 610 may control a play function, a fast forward function, a rewind function, a slow motion function and an instant replay function of the data stored in the second memory 620 according to the control signal of the controller 560. Here, the instant replay function is a function for repeatedly viewing a desired scene. The data which is currently being received in real time as well as the data which is previously stored can be instantly replayed in conjunction with the time shift function.

The memory controller 610 may scramble and store the received data in order to prevent the unauthorized copy of the data stored in the second memory 620. In contrast, the memory controller 610 may read, descramble and store the data which is scrambled and stored in the second memory 620.

If the broadcasting data for data broadcasting is included in the main service data or the mobile service data, the program table information decoder 580 may decode the broadcasting data. The data for data broadcasting may be decoded by the program table information decoder 580 and may be stored in a data storage unit 630.

If the controller 560 operates a data broadcasting application according to the request of the user, the program table information decoder 580 decodes the broadcasting data for data broadcasting and outputs the decoded broadcasting data. The application operated by the controller 560 may implement the data broadcasting output from the program table information decoder 580 and output it to the output unit 550.

The program table information decoder 580 may decode, for example, the service information such as DVB-SI or the broadcasting data according to the PSI or the PSIP. The broadcasting data for data broadcasting may be of a packetized elementary stream type or a section type. That is, the data for data broadcasting includes PES type data or section type data.

For example, the data for data broadcasting is included in a digital storage media-command and control (DSM-CC) section and the DSM-CC section may be composed of the TS packet based on 188-byte units. The identifier of the TS packet included in the DSM-CC section is included in the program table information which is a data service table (DST). If the DST is transmitted, 0×95 is allocated as the value of a stream_type field in the service location descriptor of the PMT or the VCT. The broadcasting signal receiver determines that the data for data broadcasting is received if the value of the stream-type field of the PMT or the VCT is 0×95. The data for data broadcasting may be transmitted by a data carousel method.

In order to process the data for data broadcasting, the demultiplexer 530 may perform section filtering under the control of the program table information decoder 580, discard the overlapping section, and output the non-overlapping section to the program table information decoder 580. The program table information decoder 580 can determine whether the data for data broadcasting included in the broadcasting signal is received according to the PID of the VCT. The PID of the VCT may be set in an MGT and have a fixed value.

The demultiplexer 530 may output only an application information table (AIT) to the program table information decoder 580 through the section filtering. The AIT includes information on an application executed on the broadcasting signal receiver, for the data service.

The AIT may include the information on the application, for example, the name of the application, the version of the application, the priority of the application, the ID of the application, the status of the application (auto-start, operability of the user, kill or the like), the type of the application (Java or HTML), the class of the application, the location of the stream including a data file, the base directory of the application, and the location of the icon of the application. Accordingly, information necessary for executing the application may be stored in the data storage unit 630 using the above-described information.

The application executed by the controller 560 may be received together with the broadcasting data and may be updated. A data broadcasting application manager which is executed in order to allow the controller 560 to execute the application may include a platform for executing an application program. The platform may be, for example, the Java virtual machine for executing the Java program.

If it is assumed that the data broadcasting service is a traffic information service, the broadcasting signal receiver can provide the service to the users through at least one of characters, voice, graphics, still images, moving images or the like although an electronic map or a global positioning system (GPS) module is not mounted. If the broadcasting signal receiver includes the GPS module, the data broadcasting application may be implemented after the GPS module extracts current location information (longitude, latitude, and altitude) received from a satellite. The data storage unit 630 of the broadcasting signal receiver 630 may store the electronic map including information on links and nodes and a variety of graphic information.

Figure 18:
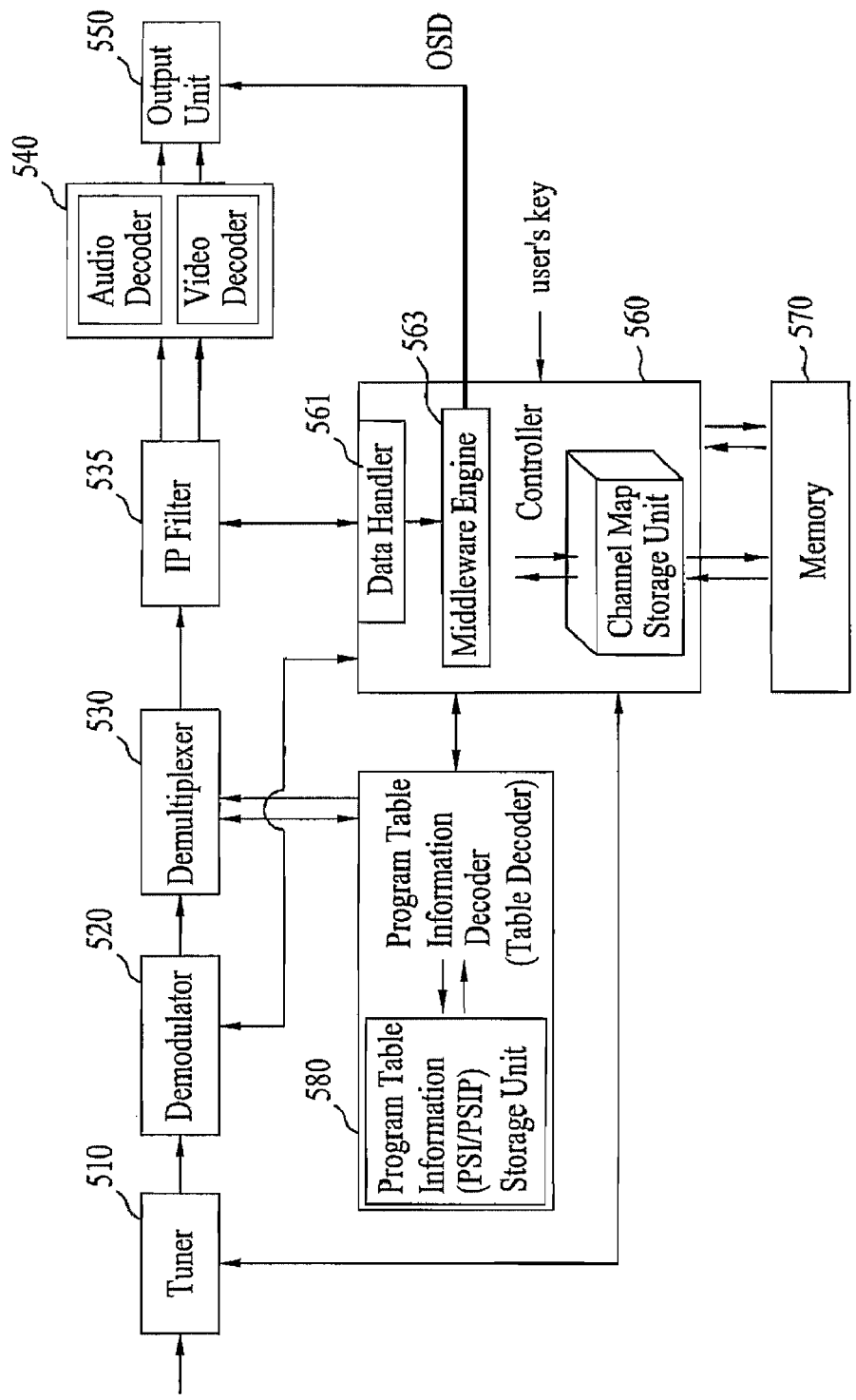
FIG. 18 is a block diagram showing a broadcasting receiver according to another embodiment.

FIG. 18 is a view showing a broadcasting signal receiver according to another embodiment. The broadcasting signal receiver according to the present embodiment will be described with reference to FIG. 18. The broadcasting signal receiver includes a tuner 510, a demodulator 520, a demultiplexer 530, an IP filter 535, a decoder 540, an output unit 550, a controller 560, a memory 570 and a program table information decoder 580. The operations of the components of the broadcasting signal receiver shown in FIG. 18, which are equal to those of FIG. 14.

For example, the controller 560 may determines whether the cell which receives the broadcasting signal is changed, from the program table information decoded by the program table information decoder 580, for example, the MGT, and obtain the cell ID if the cell is changed. Alternatively, the controller may determine whether the handover occurs from the power of the signal received by the tuner 510 and obtain the cell ID from the MGT received from the cell.

The controller 560 may obtain the channel information for transmitting the same broadcasting contents as the broadcasting contents which are received from the previous cell, from the program table information decoded by the program table information decoder 580, for example, the CIT. The channel information is the channel information of the broadcasting data identified by the broadcasting stream identifier in each cell.

The controller 560 may control the tuner 510 to tune the channel information of the changed cell and control the demodulator 520, the demultiplexer 530 and the decoder 540 to process the broadcasting signal of the tuned channel.

In the example shown in FIG. 18, the demultiplexer 530 may demultiplex the IP stream in addition to the video/audio stream and the program table information from the demodulated signal. If the IP stream is included in a private section of the MPEG-2 TS and is transmitted, the demultiplexer 530 outputs the private section including the IP stream to the program table information decoder 580. The program table information decoder 580 may decode the private section and output the IP stream to the IP filter 535. Alternatively, if the IP stream is not included in the private section and an IP datagram is included directly in demodulated stream, the demultiplexer 530 may demultiplexes the IP datagram from the demodulated signal and output the demultiplexed IP datagram to the IP filter 535.

The IP filter 535 may selectively output the IP stream selected by the user according to the control signal of the controller 560. Alternatively, the IP filter 535 filters the IP datagram including the emergency alert message regardless of the selection of the user and outputs it to the controller 560, when the emergency alert message is included in the IP datagram.

The output IP stream may be output to the decoder 540 and the video/audio information included in the IP stream may be output from the output unit 550. The IP stream may include the first program information and the second program information. Accordingly, if the emergency alert message is included in the IP datagram, the emergency alert message may be output on the output unit.

The data handler 561 may process and output the data broadcasting signal including the emergency alert message transmitted by the IP datagram from the IP filter 535. The middleware engine 563 controls the environment of the broadcasting reception system such that the data broadcasting signal is output and processes and outputs the data broadcasting signal through the output unit 550 together with the video/audio data.

A data handler 561 may process and output the data broadcasting signal transmitted from the IP filter 535 by the IP datagram, and a middleware engine 563 controls the environment of the broadcasting receiving system so as to the broadcasting data and processes and outputs the broadcasting data together with the video/audio data output from the output unit 550.

The effects of the broadcasting signal receiver and the method for transmitting/receiving the broadcasting signal are as follows.

First, the cell can be identified in the MFN environment and thus the mobile reception of the broadcasting signal is possible. Second, a broadcasting system for mobile reception compatible with a broadcasting system for fixed reception can be provided. Third, although the user moves to an area in which the broadcasting signal is transmitted with a different frequency in the MFN environment, the same broadcasting program can be conveniently viewed without tuning the channel.

Figure 19:
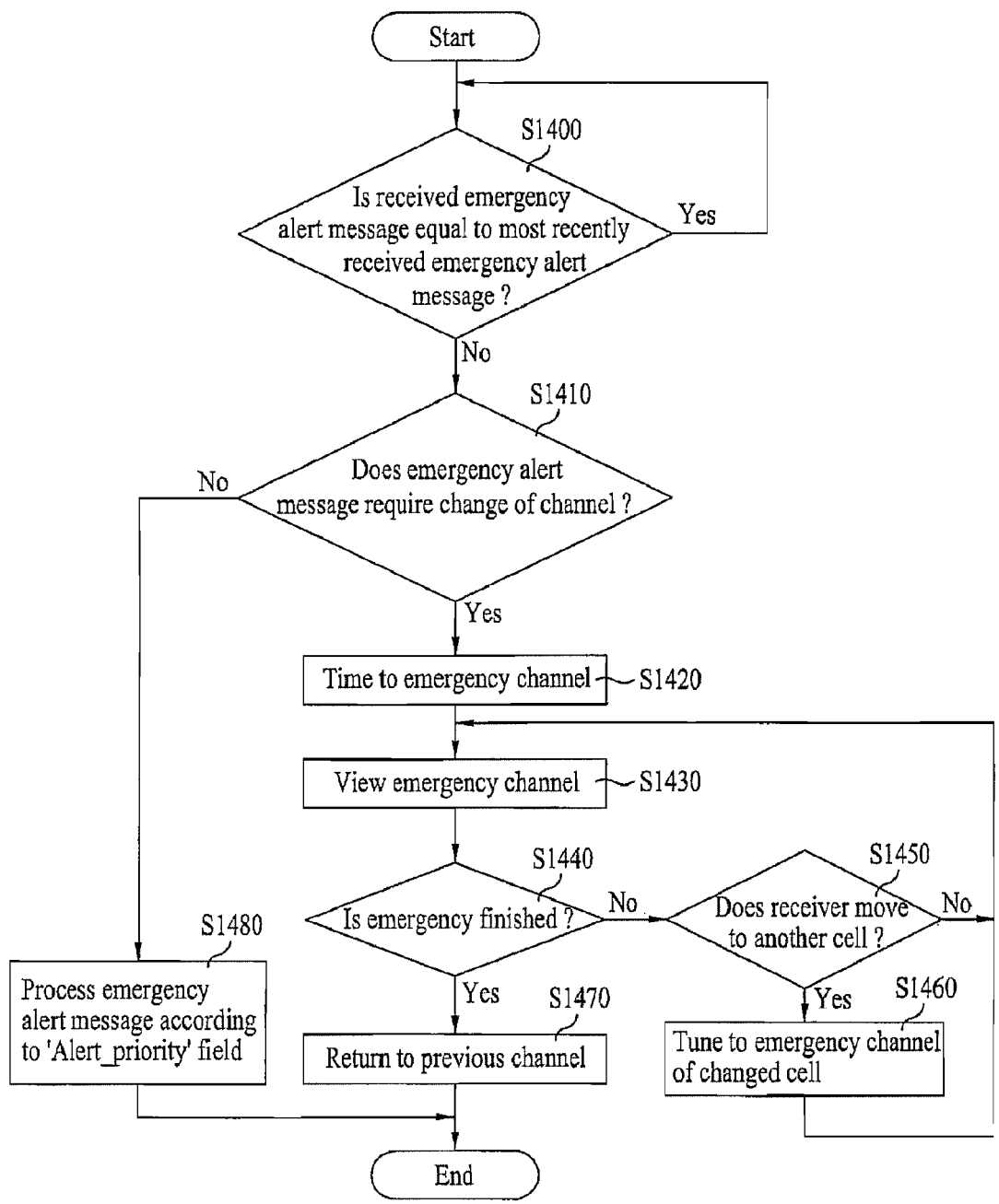
FIG. 19 is a flowchart illustrating a method for receiving a broadcasting signal including an emergency alert message.

FIG. 19 is a flowchart illustrating a method for processing an emergency alert message.

When the emergency alert message is received, the broadcasting receiver determines whether the received emergency alert message is equal to the emergency alert message which is most recently received (S1400).

If it is determined that the currently received emergency alert message is equal to the previously received emergency alert message in the step S1400, then the currently received emergency alert message is not processed and is discarded.

If it is determined that the currently received emergency alert message is not equal to the previously received emergency alert message in the step S1400, then it is checked whether the emergency alert message requires the forced change of the channel to the emergency alert channel (S1410).

If it is checked that the emergency alert message does not require the forced change of the channel in the step S1410, then the received emergency alert message is processed according to the value of the "alert_priority" field (S1480).

If it is checked that the emergency alert message requires the forced change of the channel in the step S1410, then the channel is changed to the emergency alert channel according to the channel information of the emergency alert channel included in the EAT (S1420).

The broadcasting receiver receives and displays the broadcasting signal of the emergency alert channel on the screen (S1430). If the emergency is not cancelled (S1440), then it is checked whether the broadcasting receiver moves to another cell while the broadcasting signal of the emergency alert channel is displayed on the screen (S1450). When the intensity of the received broadcasting signal weakens or the version of the program table information managed by the MGT is changed, it is determined that the cell is changed.

If it is checked that the broadcasting receiver moves to another cell in the step S1450, then the emergency alert broadcasting signal is continuously displayed on the screen using the emergency alert channel information of the changed cell included in the EAT (S1460). When it is checked that the cell is changed, the cell ID can be obtained. The cell ID may be obtained by parsing the MGT or the EAT or may be obtained from the signaling information of the received signal.

If it is checked that the broadcasting receiver does not move to another cell in the step S1450, then the broadcasting signal of the emergency alert channel is continuously displayed on the screen (S1430).

If the emergency is cancelled (S1440), then the channel is returned to the previous channel before tuning to the emergency alert channel (S1470).

If the broadcasting receiver does not move to another cell, then the channel is returned to the previous channel using the channel information of the previous channel stored in the broadcasting receiver.

When the broadcasting receiver moves to another cell, the channel is returned to the previous channel using the channel information of the cells, the cell ID of the current cell and the channel information of the previous channel stored in the broadcasting receiver.

As described above, in a method for processing an emergency alert broadcasting signal, a data structure, and a broadcasting receiver according to the present invention, it is possible to continuously provide a service such as an emergency alert message even in a reception system for receiving a broadcasting signal while moving.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed:

1. A method of receiving a broadcast signal in a receiver, the method comprising:
    receiving a broadcast signal in which main data and data groups of mobile data are multiplexed, wherein the receiver is turned on during slots, and the data groups are received during the slots which are basic time periods for multiplexing of the mobile data and the main data,
    wherein each data group includes the mobile data, signaling information and a plurality of known data sequences, at least two of the known data sequences having different lengths than each other, and
    wherein the main data is data encoded by a systematic Reed-Solomon (RS) encoding method, and the mobile data is data encoded by an additional forward error correction (FEC) process and a non-systematic RS encoding method;
    demodulating the received broadcast signal;
    decoding the signaling information; and
    decoding the mobile data in the demodulated broadcast signal, wherein an error detection for the mobile data is performed and an error correction for the mobile data is performed by RS decoding.

2. The method of claim 1, wherein the mobile data includes an emergency alert message.

3. The method of claim 2, wherein the emergency alert message includes carrier frequency information of a channel in which the emergency alert message is transmitted.

4. The method of claim 2, wherein the emergency alert message includes program number information of a channel in which the emergency alert message is transmitted.

5. The method of claim 1, wherein the mobile data includes a cell information table (CIT), the CIT having carrier frequency information of transmitters in adjacent cells, and wherein a service of the mobile data continues to be outputted to a user based on the CIT when the receiver moves from a coverage area of a first transmitter to a coverage area of a second transmitter.

6. An apparatus for receiving a broadcast signal in a receiver, the apparatus comprising:

a tuner configured to receive a broadcast signal in which main data and data groups of mobile data are multiplexed, wherein the receiver is turned on during slots, and the data groups are received during the slots which are basic time periods for multiplexing of the mobile data and the main data, wherein each data group includes the mobile data, signaling information and a plurality of known data sequences, at least two of the known data sequences having different lengths than each other, and wherein the main data is data encoded by a systematic Reed-Solomon (RS) encoding method, and the mobile data is data encoded by an additional forward error correction (FEC) process and a non-systematic RS encoding method;

a demodulator configured to demodulate the received broadcast signal;

a first decoder configured to decode the signaling information; and a second decoder configured to decode the mobile data in the demodulated broadcast signal, wherein an error detection for the mobile data is performed and an error correction for the mobile data is performed by RS decoding.

7. The apparatus of claim 6, wherein the mobile data includes an emergency alert message.

8. The apparatus of claim 7, wherein the emergency alert message includes carrier frequency information of a channel in which the emergency alert message is transmitted.

9. The apparatus of claim 7, wherein the emergency alert message includes program number information of a channel in which the emergency alert message is transmitted.

10. The apparatus of claim 6, wherein the mobile data includes a cell information table (CIT), the CIT having carrier frequency information of transmitters in adjacent cells, and wherein the apparatus continues to output the service to a user based on the CIT when the apparatus moves from a coverage area of a first transmitter to a coverage area of a second transmitter.

* * * * *